US009640149B2

(12) United States Patent
Keramidas et al.

(10) Patent No.: US 9,640,149 B2
(45) Date of Patent: May 2, 2017

(54) METHODS FOR FIXED RATE BLOCK BASED COMPRESSION OF IMAGE DATA

(71) Applicant: THINK SILICON SA, Patras (GR)

(72) Inventors: Georgios Keramidas, Patras (GR); Chrysa Kokkala, Patras (GR); Iakovos Stamoulis, Patras (GR); George Sidiropoulos, Patras (GR); Michael Koziotis, Patras (GR)

(73) Assignee: THINK SILICON SA, Patras (GR)

( * ) Notice: Subject to any disclaimer, the term of this patent is extended or adjusted under 35 U.S.C. 154(b) by 0 days.

(21) Appl. No.: 14/804,378

(22) Filed: Jul. 21, 2015

(65) Prior Publication Data

US 2017/0025098 A1    Jan. 26, 2017

(51) Int. Cl.
*G09F 5/00* (2006.01)
*G09G 5/39* (2006.01)
*G06T 1/60* (2006.01)
*G06T 9/00* (2006.01)

(52) U.S. Cl.
CPC .............. *G09G 5/39* (2013.01); *G06T 1/60* (2013.01); *G06T 9/00* (2013.01); *G09G 2360/18* (2013.01)

(58) Field of Classification Search
CPC .............. G06T 1/60; G06T 9/00; G09G 5/39
USPC .......................................... 345/549
See application file for complete search history.

(56) References Cited

U.S. PATENT DOCUMENTS

| 5,956,431 | A  | * | 9/1999  | Iourcha | G06T 9/00 382/166 |
| 6,587,117 | B1 | * | 7/2003  | Wright  | G06T 11/001 345/501 |
| 8,149,243 | B1 | * | 4/2012  | Kilgard | G06T 15/04 345/530 |
| 2007/0127812 | A1 | * | 6/2007 | Strom | G06T 9/008 382/166 |
| 2012/0281005 | A1 | * | 11/2012 | Nystad | H04N 19/90 345/582 |
| 2015/0093024 | A1 | * | 4/2015 | Pajak | G06T 9/00 382/166 |

* cited by examiner

*Primary Examiner* — Gregory J Tryder
*Assistant Examiner* — Yuehan Wang
(74) *Attorney, Agent, or Firm* — Jason H. Vick; Sheridan Ross, PC

(57) ABSTRACT

A set of methods, techniques and hardware is described for compressing image data for memory bandwidth and memory storage reduction in graphics processing systems. The disclosed technology can be used for compressing image data sent to the frame buffer and/or image data residing in the frame buffer. The compression process can be based on an adaptive number of base color points and an adaptive number of quantized color points. An adaptive technique for compressing alpha values based on pre-calculated maps or using an estimated alpha value based on thresholds is also disclosed. An implementation of the disclosed methods has, for example, a low hardware overhead, low buffering requirements, and low and predefined compression latency. Also, the disclosed methods allow, for example, random accesses to compressed image data.

24 Claims, 18 Drawing Sheets

619 — IN FLOW DIAGRAM DEPICTED in FIG. 6A, THE FOLLOWING NOTATIONS ARE USED:

620 — Rmax IS THE MAXIMUM ARITHMETIC VALUE OF RED CHANNEL ACROSS ALL PIXELS IN BLOCK;

621 — Rmin IS THE MINIMUM ARITHMETIC VALUE OF RED CHANNEL ACROSS ALL PIXELS IN BLOCK;

622 — Gmax IS THE MAXIMUM ARITHMETIC VALUE OF GREEN CHANNEL ACROSS ALL PIXELS IN BLOCK;

623 — Gmin IS THE MINIMUM ARITHMETIC VALUE OF GREEN CHANNEL ACROSS ALL PIXELS IN BLOCK;

624 — Bmax IS THE MAXIMUM ARITHMETIC VALUE OF BLUE CHANNEL ACROSS ALL PIXELS IN BLOCK;

625 — Bmin IS THE MINIMUM ARITHMETIC VALUE OF BLUE CHANNEL ACROSS ALL PIXELS IN BLOCK;

626 — [Rmax] IS THE INDEX OF PIXEL WITH RED CHANNEL EQUAL TO Rmax;

627 — [Rmin] IS THE INDEX OF PIXEL WITH RED CHANNEL EQUAL TO Rmin;

628 — [Gmax] IS THE INDEX OF PIXEL WITH GREEN CHANNEL EQUAL TO Gmax;

629 — [Gmin] IS THE INDEX OF PIXEL WITH GREEN CHANNEL EQUAL TO Gmin;

630 — [Bmax] IS THE INDEX OF PIXEL WITH BLUE CHANNEL EQUAL TO Bmax;

631 — [Bmin] IS THE INDEX OF PIXEL WITH BLUE CHANNEL EQUAL TO Bmin;

FIG. 6B

METHODS FOR FIXED RATE BLOCK BASED COMPRESSION OF IMAGE DATA

FIELD

The disclosed technology relates generally to the field of image compression at least for memory bandwidth and memory storage conservation in image processing systems and, more particularly, in three dimensional (3-D/3D) rendering systems.

BACKGROUND

Technology is described herein for compressing image data for use in graphics applications, such as three dimensional (3D) game applications, and the like. The disclosed technology at least offers specific advantages, such as low overhead and low latency implementation; thereof, the disclosed technology may be used for compressing in real time images sent to the frame buffer and/or for compressing image data residing in the frame buffer.

Compressing of image data residing in the frame buffer may be used for creating compressed textures, for example, during render-to-texture operations as supported by common graphics APIs, such as OpenGL® and DirectX®. In another aspect of the disclosed technology, compressing of image data residing in the frame buffer may be used for reducing the memory bandwidth between the frame buffer and the display. In yet another aspect of the disclosed technology, compressing images residing in the frame buffer with a fixed rate compression leads to a reduction of the size of the frame buffer and the frame buffer can be accessed with random accesses.

The disclosed compression technologies are block based, that is, compression is applied to non-overlapping or disjoint portions of a source image, called blocks hereafter. In block based compression, a source image is divided into blocks and blocks can be of any desired and suitable size or shape. In the disclosed technology, each block is preferably rectangular and the preferred size and shape is four-by-four pixels. However, different block sizes/shapes/arrangements are also possible. For example, an arrangement in which blocks comprising two-by-eight or eight-by-two pixels can be used.

Those skilled in the art will recognize that a conventional block based compression process (e.g., S3TC texture compression) includes the parsing of the source image blocks so as to extract respective components. The components may be main color information, color index information, main alpha information, and alpha index information. Also, additional control information may be extracted e.g., if the source image block is monochrome.

Block based image compression with fixed compression ratios are extensively employed to compress textures. Compressing textures in a block based way with fixed compression ratio is a preferable technique, because the decompression process requires typically a small number of cycles, e.g., 1 cycle, thus it can be performed in real time. A major limitation of conventional block based image compression techniques is that the associated compression process requires multiple cycles to be completed, thus, it is not suitable for compressing "rendered data" in real time. Another limitation of typical block based image compression techniques is that the implementation of the image compression process is complex and it has a significant associated hardware cost. Upon the complete reading of the present disclosure, those skilled in the art will recognize that in the disclosed technology, at least the above limitations, among other limitations not described thus far, have been overcome.

The term "rendered data" is used herein to identify computer generated graphics data that are in a displayable format e.g., in RGB (red-green-blue) format. Rendered data are generated typically by a graphics processing hardware or software system and they are typically located in a frame buffer. The format of rendered data will be detailed in the Detailed Description part of the present disclosure.

Those skilled in graphics technology know that a texture could be image data (either photographic or computer generated), transparency data, smoothness data, etc. Generating realistic computer graphics typically requires multiple textures of high quality. Providing the textures to the rendering unit requires tremendous computer memory and bandwidth typically not present in mobile and handheld devices. Texture compression may significantly decrease memory and bandwidth requirements.

Therefore, texture compression has been widely employed in graphics hardware. However, as known in the art, image compression in general and texture compression in particular has proven to be complex and several different approaches have been proposed. Among the various compression schemes described in the art, the most suitable ones are the block based schemes with fixed compression ratio. This is because the compression schemes simplify the memory address generation process, especially the memory accesses to continuous memory blocks (known as burst accesses), since the address generation unit (AGU) of the graphics hardware is implemented based on simple arithmetic operations e.g., multiplications in which the multiplicand is a power of two number.

Some block based fixed rate image compression schemes are described briefly below.

Vector Quantization, referred as VQ hereafter, is amongst the oldest types of image compression. VQ operates by identifying a limited set of representative pixels or representative groups of pixels among all the pixels of the source image block. The set of representative pixels or group of pixels is usually termed as dictionary or codebook; the term codebook will be used hereafter. For each pixel of the source block, an index to the most closely approximate codebook entry is calculated. VQ is able to report high compression ratios while retaining acceptable quality, but it is not uncommon to generate significant visual artifacts, such as smooth gradients. Generally, it can be considered that the per-bit quality achieved by VQ compression is relatively low, thus the technique has been superseded by more efficient techniques.

ETC is another block based, fixed rate encoding scheme for compressing image data. The acronym ETC stands for Ericsson Texture Compression. In ETC, the source image block is divided into two subblocks typically referred as chunks. For example, an uncompressed four-by-four pixel block is split into two four-by-two or two-by-four pixel chunks. For each chunk, a representative base color is calculated. Apart from the two base colors, the remaining bits are used as indices to indicate specific, pre-calculated numerical values. The values are used as offsets to the base color of a chunk, that is, the values are added to the base color and the result of the addition is used as the final color of a pixel. The process is repeated for all the pixels of a source image block.

ETC2 scheme expands ETC1 in a backwards compatible way to provide a compression of higher quality by introducing three additional modes. However, as is known in the art, encoding only one base color for a given chunk may result in relatively poor image quality, especially for chunks with diverse colors. In addition, ETC2 has very limited support for encoding images with transparency information.

DXTn (also referred as S3TC or DXTC), as suggested in U.S. Pat. No. 5,956,431, is a block based, fixed rate image compression scheme that has been widely employed by the graphics standards, e.g., by the OpenGL standard of the Khronos group. In DXT1 (an embodiment of the DXTn group of compression schemes), two 16-bit RGB representative base colors are calculated for each four-by-four pixel image block. The representative base colors will be referred to as endpoints hereafter. Based on the mode of operation, apart from the two endpoints, one or two additional colors are generated as the result of the linear interpolation between the two endpoints. The linear interpolation is performed using predefined weighted values. Finally, an index of 2-bits for each pixel is produced to choose among the colors i.e., the two endpoints and the one or two interpolated colors.

The DXTn family of compression algorithms includes DXT1, DXT2, DXT3, DXT4, and DXT5. The compressed format of all variations of DXT1 is 128-bits long, while DXT1 compressed format is 64-bits long. Also, in all the schemes of DXTn, the source image block is a four-by-four pixels block. DXT1 is primary used to compress RGB color data however there is a specific arrangement in DXT1 to indicate if a one or more pixels are fully transparent.

In DXT2, DXT3, DXT4, and DXT5 arrangements, the 64-bits (among the 128-bits) are used to compress the RGB color data of a block in a way very similar to DXT1. The remaining 64-bits are used to encode transparency (i.e., alpha) information. As will be recognized by those skilled in the art of computer graphics, DXT2 and DXT3 are suitable for compressing blocks in which the changes in alpha values across the block are considered as "sharp". To the contrary, DXT4 and DXT5 are suitable for compressing blocks in which the changes in alpha values across the block are considered as "gradient".

The applicants want to acknowledge that the terms "sharp" and "gradient" are intentionally not explicitly defined herein. An explicit definition of the said terms is not considered necessary for the complete understanding of the present technology. Both terms are used to describe two different arrangements in the relation between the arithmetic values of the alpha channel within the pixels belonging to a source image block.

One exemplary deficiency in the art is a method/technique for compressing high quality image data including alpha values of different arrangements, e.g., for compressing to generate high quality image blocks in which the changes in alpha values across an image block are considered either gradient or sharp.

Apart from the encoding of transparency values, it is also known by those skilled in image compression that DXTn represents the RGB color data quite well in the majority of the cases. However, there are specific image block arrangements in which DXTn compression results in poor image quality. Those specific example cases are briefly explained below.

First, DXTn results in poor image quality in image blocks having many different color tints. By way of a non-limiting example, this may occur in image blocks in which the colors include near black, near white, and some other, more saturated colors. In this particular example, the two encoded colors, along with implied or interpolated colors, may not accurately represent the colors of a source image block. This is because blending two of the three colors may not produce the third color.

Second, the low precision of the endpoints in DXTn and the small number of interpolants can generate undesirable noise on color gradients; this is usually termed as blocking effect. The effect is more pronounced when the color gradients are oriented diagonally within the block.

Third, DXTn results in low image quality in image blocks that have multiple separate color gradients at different orientations in the color space. This is because one or more of the color gradients must be ignored during the encoding process. This case happens frequently in images known as bump maps.

FXT1 is another block based, fixed rate compression scheme. In essence, FXT1 is similar to DXTn with some additional block types and also FXT1 contains a 4 bits-per-pixel (bpp) compression mode for encoding images with Alpha values. However, it is known in the art, in many cases FXT1 may suffer from the same problems appearing in DXTn and, overall, the gains in image quality of FXT1 over DXTn were never conclusive.

PVRTC and its extension PVRTC2 are yet another block based, fixed rate compression scheme. The idea behind the schemes is to scale an image down to a fraction of its initial size and then scales it up so as to get a good approximation of the initial image. Under this scenario, the actual compression is achieved by storing the downscaled version and including some additional data in order to end up with an accurate representation of the source image.

As is known in the art, PVRTC and PVRTC2 schemes work very well for some specific arrangements of image data (e.g., in smooth gradients) and they can scale well to very low bit rates (e.g., in 2 bpp). To the contrary, in some other types of image data, the schemes may lead to blurred images and/or may miss some high frequency details, e.g., to introduce specific visual artifacts, like high frequency modulation noise and image ringing noise. In addition, as will be recognized by those skilled in the art, the fact that the PVRTC and PVRTC2 require in some cases random accesses to three neighboring blocks in order to process a given input block complicates significantly the memory management of a system that uses the compression schemes.

Yet another block based, fixed rate compression scheme is ASTC. ASTC stands for Adaptive Scalable Texture Compression. In essence, ASTC shares many features with the formats described so far. In ASTC, the blocks of the source image are encoded to 128-bit vectors. However, ASTC supports input image blocks of different sizes and shapes.

ASTC is considered as the block based, fixed rate compression scheme that results in a higher image quality compared to compression schemes mentioned so far, but the hardware implementation of a ASTC compressor is complex, it has a significant hardware cost and the high latency of the compression process may require a large additional hardware cost for buffering throughout the system to compensate for the latency. Therefore, the applicants believe that ASTC is an impractical scheme for real time compression, e.g., for compressing image data sent to the frame buffer and/or image data residing in the frame buffer.

A review of the current block based, fixed rate image compression schemes and their limitations, as presented herein, reveals that there remains scope for improvements in compressing in real time image data sent to the frame buffer and/or in compressing image data residing in the frame buffer in graphics processing systems. Therefore, there is a need for methods that maximizes the accuracy of compressed images, both of color and transparency data, while minimizing storage, memory bandwidth requirements, and encoding hardware complexities, while also compressing image data blocks into convenient sizes to maintain alignment for random accesses to one or more pixels.

SUMMARY

An exemplary embodiment provides a set of methods/techniques/systems to enable electrical power, memory storage, and memory bandwidth conservation in graphics processing systems. One or more of these advantages may be achieved by compressing image data for use in graphics applications, such as 3D game applications. Upon the complete reading of the present disclosure, those skilled in the art will recognize that the disclosed methods have specific beneficial features, such as low overhead and low latency implementations, thereof, the methods may be used for compressing in real time image data sent to the frame buffer and/or for compressing image data residing in the frame buffer.

An exemplary embodiment of the disclosed image compression methods are lossy, that is, during compression the quality of the compressed images may be reduced compared to the original, uncompressed images. In addition, the disclosed methods are block based, that is, compression is applied to non-overlapping or disjoint portions of an image, called blocks, and blocks are of fixed size and shape with a fixed number of pixels. Also, the disclosed compression methods are fixed rate, that is, the number of bits in all compressed blocks remains fixed. Those skilled in the art will acknowledge that the two latter characteristics of the disclosed methods enable random accesses in compressed data, they reduce significantly the hardware costs for buffering, and they simplify significantly the memory management of the graphics processing system.

The first stage of the compression methods includes an Image Decomposer module. The Image Decomposer module receives an image from a source input (e.g., from a rendering engine) and it is responsible to split the received image into some number of blocks. The decomposer forwards the derived blocks to another module, called the Block Encoder, for further processing. The Block Encoder module encodes each image block into a fixed size compressed form. One or multiple Block Encoders may coexist in the same compression system.

One or more Block Encoders are coupled to an Image Composer module. The exemplary role of the Image Composer is to receive the compressed blocks and assemble them in a suitable order, so as to produce the final compressed image that is a lossy representation of the source image. In one exemplary embodiment, the Image Composer is also equipped with a memory interface unit and the memory interface unit can be configured by the rendering unit so as to store the compressed image in a suitable on-chip or off-chip memory, e.g., the on-chip frame buffer or the off-chip frame buffer or the texture memory. Sometime later, the compressed image data may be decompressed by an Image Decompression module. An essential part of the said Image Decompression module is also disclosed herein.

As it can be understood by those skilled in the art of image compression, the most critical module of the disclosed compression process is the Block Encoder module. In one exemplary embodiment, the Block Encoder module includes a Mode Selection module that is coupled to an Endpoint Selection module. The Endpoint Selection module is, in turn, coupled to an Index Extraction module. Finally, the Index Extraction is coupled to a Bitmap Generation module.

In another exemplary embodiment, multiple instances of the modules e.g., of the Index Extraction module, may be included in the design. In yet another exemplary embodiment, multiple Block Encoder modules operating on different image blocks may coexist and operate in parallel.

In accordance with one exemplary embodiment, the Block Encoder module is used to compress color data, e.g., pixel data based on 8-bit red, 8-bit green, and 8-bit blue color plane format. In a yet another embodiment, the Block Encoder module may be coupled to a Transparency Encoder module for encoding transparency data. The Transparency Encoder module is also disclosed herein.

In essence, the role of Block Encoder module is to parse the source image blocks so as to extract respective components of an input block. As can be understood by those skilled in the art, the latter functionality defines to a large degree the loss in quality occurring during the lossy compression process. The components may be main color information, color index information, main alpha information, and alpha index information. Obviously, the latter two features are extracted if there is an embodiment of the compression system that includes a Transparency Encoder module. In addition and in accordance with one exemplary embodiment, additional control information may be extracted, e.g., if the alpha values across all pixels in the block are constant or almost constant.

The exemplary Mode Selection module, part of Block Encoder module, aims to identify the appropriate number of base colors within a block. The base colors may act as representative colors of the block that, in turn means, all the pixels in the block will be mapped into the base colors or into specific quantized colors inferred or interpolated from the selected base colors. The base colors will be referred to as endpoints hereafter. In some prior art block based, fixed rate compression schemes, e.g., in DXTn schemes, the number of endpoints is constant and equal to two in all image blocks. In accordance with one exemplary embodiment, the Mode Selection module outputs if the encoding of a given block will be performed utilizing two (compression mode 0) or three (compression mode 1) endpoints. Since the final compressed form includes only a limited range of bits intended to host the endpoints (either two or three), in the case of three endpoints, the endpoint representation will be done with low precision color data.

The Endpoint Selection module receives configuration information from the Mode Selection module. The Endpoint Selection module operates to identify two or three RGB color values that will act as endpoints. In one exemplary embodiment, the endpoints are a subset of the pixels in an image block, that is, the endpoints are selected from the pixels of the block. In another embodiment, the endpoints are calculated using, e.g., a curve fitting procedure. Obviously, the former embodiment leads to lower implementation costs and lower electrical power consumption compared to the latter embodiment.

In another exemplary embodiment, the Index Selection module traverses one-by-one the pixels in the block in order to construct a bitmap value for each pixel. Each bitmap value is an index indicating which of the quantized colors or endpoints best matches the pixel. In both compression modes, the quantized colors are interpolated by two endpoints using predefined weighted values. In addition, in compression mode one, the module performs the additional task of selecting the appropriate pair of endpoints. Finally, the Bitmap Generation module constructs the final compressed block by ordering the selected endpoints, the index bits, and endpoint pair selection bits in a preferred arrangement.

Transparency information in the compressed blocks may be inserted by yet another module disclosed herein called Transparency Encoder module. The module operates in an adaptive manner selecting either a constant alpha value across all the pixels in the block or a block map with predefined alpha values. In a particular exemplary embodiment, the maps with alpha values are pre-calculated prior to image compression.

This brief summary is provided to introduce a selection of concepts in a simplified form that are further described below in the Detailed Description and also illustrated in the accompanying drawings. This summary is not intended to identify key features or essential features of the claimed subject matter, nor is it intended to be used to limit the scope of the claimed subject matter.

BRIEF DESCRIPTION OF THE DRAWINGS

The aspects and advantages of the present invention are better understood from the detailed description of preferred embodiments of the invention with reference to the drawings, in which:

FIGS. 6A and 6B illustrate an abstract flow diagram of an exemplary embodiment of an Endpoint Selection module in accordance with one or more aspects disclosed herein;

DETAILED DESCRIPTION

In the following description, numerous specific details are set forth to provide a more thorough understanding of the present technology. However, it will be apparent to one of skill in the art that the technology disclosed herein may be practiced without one or more of these specific details. In other instances, well-known features have not been described in order to avoid obscuring the present disclosure.

Some of the exemplary methods disclosed herein relate to the processing of image data in graphics processing systems and, in particular, to the compression of image data for use in graphics applications, such as 3D graphics applications. Although the embodiments described herein are generally illustrated in the specific context of low cost compression of computer generated image data, those skilled in the art will appreciate the broader applicability of the disclosed techniques.

Upon the complete reading of the present disclosure, those skilled in the art will recognize that the disclosed methods offer specific advantages, such as low overhead and low latency implementations, thereof, the disclosed methods may be used for compressing in real time images sent to the frame buffer and/or for compressing image data residing in the frame buffer.

The disclosed technology may be used for electrical power, memory bandwidth, and memory storage conservation in image processing systems and, more particularly, in 3D rendering systems.

Figure 1:
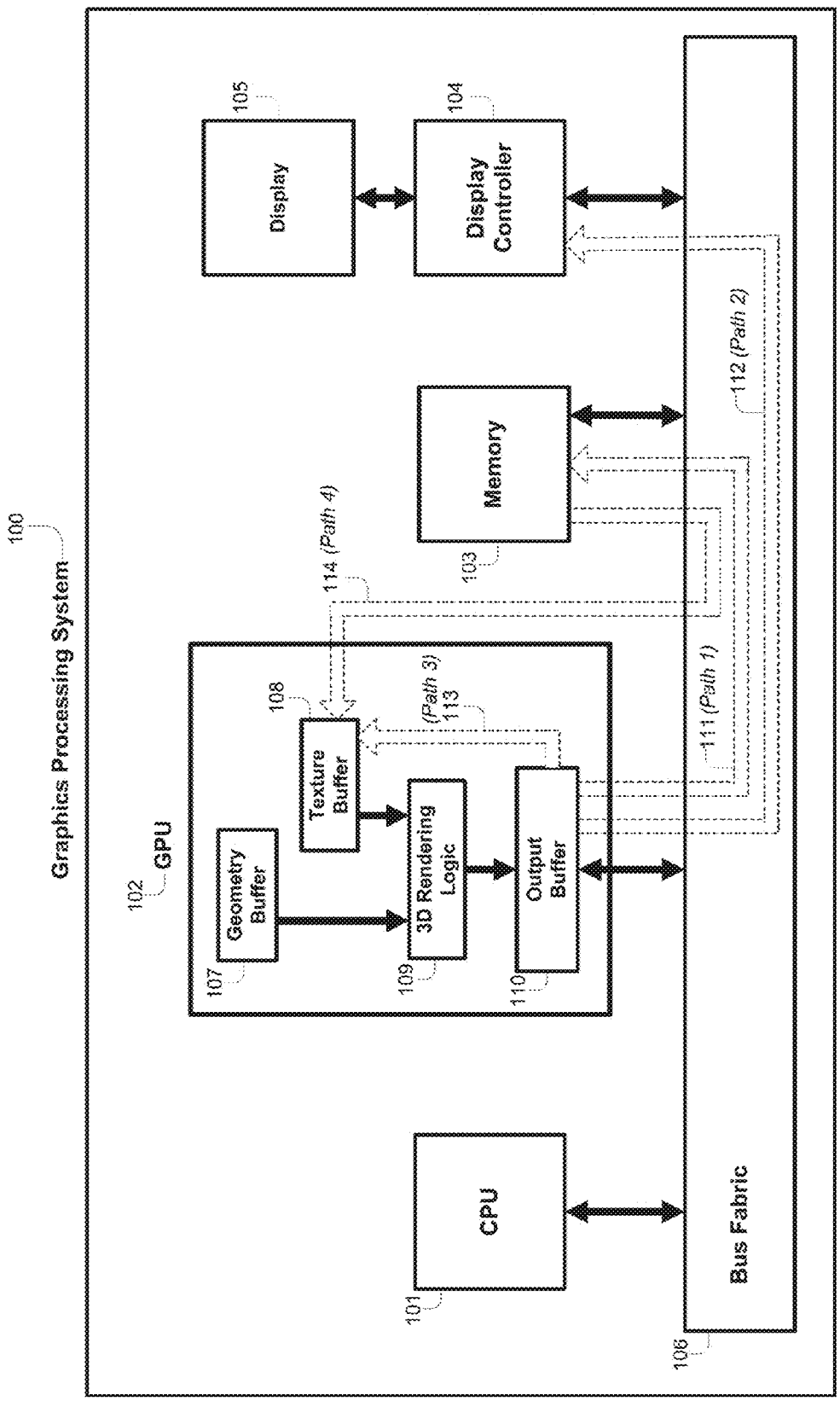
FIG. 1 illustrates a block diagram of an exemplary graphics processing system in accordance with one or more aspects disclosed herein.

FIG. 1 illustrates an exemplary block diagram of an arrangement of a graphics processing system 100 constructed in accordance with one exemplary embodiment. The arrangement includes a graphics processing unit (GPU) 102, a memory 103, and a display 105. The display of the system is updated through a display controller 104. In addition, the display may be, but is not limited to, a LCD screen or a TFT LCD screen. The system also includes a general purpose central processing unit (CPU) 101 and a bus fabric 106 that couples the components 101, 102, 103, 104 of the graphics processing system 100. Other components, not shown in FIG. 1, may be included in the system, such as input devices, output devices, external memory, storage devices, etc.

The bus fabric 106 may be a conventional data bus or a more complex interconnection medium or even a combination of different buses. The CPU 101 may be a conventional processing unit, such as ARM A9 processor, and it can be a single core or a multi-core processor. Memory 103 is also a conventional component as can be recognized by those skilled in the art e.g., memory can be DDR-SDRAM.

The CPU graphics and imaging functionality can be performed by the GPU 102. It is to be appreciated that the technology described herein is also applicable in GPUs with different arrangements, e.g., in GPUs following either the tile based rendering or the immediate mode rendering paradigm. The exemplary arrangement of the GPU illustrated in FIG. 1 includes, inter alia, a 3D rendering logic 109 and two memory buffers for storing geometry and texture data, termed as geometry buffer 107 and texture buffer 108. The two buffers may either operate as conventional cache memories or as conventional software controlled memories, i.e., scratchpad memories. In addition, a third buffer, called Output Buffer 110, can be used to hold a portion of the output frame or the entire output frame generated by the GPU 102. The output frame is typically in displayable format, that is, the output frame is ready to be displayed on the display device 105.

One role of the GPU 102 is to render 3D images. An image is synthesized from a model including mainly geometric shape descriptions, e.g., vertices, and appearance descriptions, e.g., textures, for each object in the scene.

Additional descriptions may be required, e.g., environment descriptions, such as lighting or atmospheric properties. The result of the synthesis of the descriptions is an image represented as a two dimensional (2D) rectangular array of pixel elements, where each pixel represents a discrete color sample of the image.

The details of synthesizing a final image from a plurality of objects are well known by those skilled in computer graphics and are not necessary for a complete understanding of the present techniques.

The generated image is eventually sent to the frame buffer. In accordance with one exemplary embodiment, the format of the pixels in the output image is preferably in RGB or RGBA (RGB plus alpha) format, however the present technology is generally applicable and it not limited to a specific color depth of the said formats.

The frame buffer holds the 2D images generated by the rendering unit. However, different arrangements in the position of the frame buffer may exist in a typical graphics processing system 100. The compression methods described herein are generally applicable and are able to provide one or more of electrical power, memory bandwidth, and memory storage conservations irrespectively of the position of the frame buffer within the graphics processing system.

In one embodiment, the frame buffer is hosted in the system main memory 103. According to this embodiment, upon the generation of a portion of the output frame being completed, the image data is forwarded from the Output Buffer 110 to Memory 103 via Path 1 111 as illustrated in FIG. 1.

In another embodiment, the frame buffer can be a separate off-chip memory. This embodiment is not depicted in FIG. 1, however those skilled in the art will recognize that the disclosed compression methods offer almost similar benefits as the previous embodiment.

In yet another exemplary embodiment, the frame buffer can be located in the display controller 104. In the embodiment, the generated image data can be forwarded to the display controller 104 via Path 2 112 as depicted in FIG. 1.

In the above exemplary embodiments, the frame buffer is typically accessed by the rendering unit via memory write operations when a new frame or a portion of a new frame is ready for display and by the display controller via read operations. Furthermore, additional frame buffer update operations are also possible, e.g., the rendering unit may read the contexts of the frame buffer in order to perform additional image blending operations.

Writing and reading operations of the image data to the frame buffer consumes a relatively significant memory bandwidth. For example, new frames may need to be written to and read from the frame buffer at rates of 50 frames per second (fps) or higher, and each frame may require a significant amount of data, particularly for higher resolution displays and high definition (HD) graphics. Thus, the memory bandwidth savings when using the compression methods described herein can be relatively significant.

However, those skilled in low power system design will recognize that a reduction of the memory bandwidth required for the frame buffer traffic may lead to electrical power savings in a graphics processing system 100 under specific circumstances. For example, the amount of electrical power needed to compress and decompress the image data must be lower than the amount of electrical power savings achieved due to the reduction in the memory bandwidth. Moreover, the compression and decompression methods must have a low latency implementation, i.e., the time needed to compress and decompress the image data must be relatively low, otherwise a large hardware cost for buffering throughout the system may be required.

In yet another embodiment, the frame buffer can be located on-chip. By way of a non-limiting example, the Output Buffer 110 may serve the role of the on-chip frame buffer. Obviously, the embodiment may lead to a significant reduction in electrical power because an amount of off-chip memory accesses will be eliminated; however, it is understood that the costs of a relatively large on-chip memory to hold the entirety of the frame buffer may be relatively high prohibiting a practical implementation of the embodiment.

The exemplary compression methods disclosed herein may be used for reducing significantly, e.g., by 75%, the size of the frame buffer thereby enabling a practical implementation of a graphics processing system with an on-chip frame buffer. Furthermore, and in accordance with one disclosed compression techniques, a block based and fixed rate compression technique can simplify considerably the memory management of the on-chip frame buffer, e.g., by allowing random accesses to on-chip frame buffer data.

In a further aspect, compressing of image data residing in the frame buffer may be used for creating compressed textures, e.g., during render-to-texture operations as supported by common graphics APIs, such as OpenGL and DirectX.

Existing texture compression techniques require multiple cycles to be completed, therefore, those schemes are not suitable for compressing in real time image data generated by a rendering unit. In addition, another limitation of prior art texture compression techniques is that the techniques have significant associated hardware costs. Upon the complete reading of the present disclosure, those skilled in the art will recognize that in the disclosed methods, the limitations, among other limitations, not described thus far, have been overcome.

An embodiment of a render-to-texture operation in the case of an on-chip frame buffer is depicted in FIG. 1 through Path 3 113. An embodiment of the operation in the case of an off-chip frame buffer is also depicted in FIG. 1 through Path 4 114.

The disclosed compression methods follow the block based, fixed compression rate paradigm. In block based image compression techniques, compression is applied to non-overlapping or disjoint portions of an image. If a block based image compression scheme has a fixed compression rate, then each image block is encoded into a bit vector and the numbers of bits in all compressed blocks, i.e., in the encoded bit vectors, remains fixed.

Those skilled in the art of system design will acknowledge that the two latter characteristics of the disclosed methods enable random accesses in compressed data, they reduce significantly the hardware costs for buffering, and they simplify significantly the memory management of a graphics processing system 100. For example, random accesses to an image block may allow to decode selectively only the needed regions of an image (where a region may be consisted of a plurality of image blocks) and it also may allow to decompress the blocks of a compressed image in an arbitrary order.

Figure 2A:
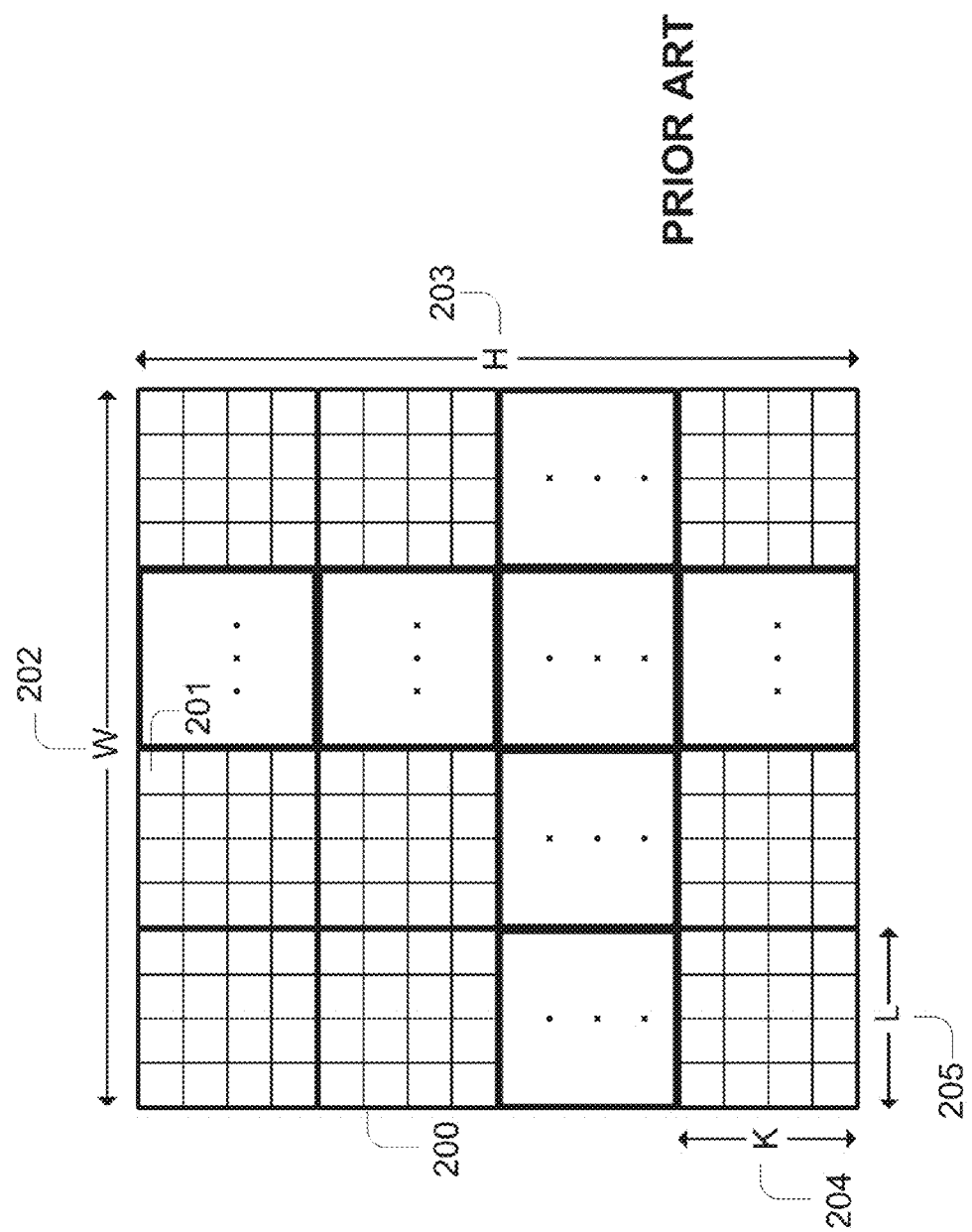
FIG. 2A illustrates a fixed size block of pixels that is compressed using prior art block compression technique.

FIG. 2A illustrates an example of an image 200 comprising pixels 201. The image has W pixels 202 in width and H pixels 203 in height, where W and H are positive integer numbers. In accordance with one exemplary embodiment the image may be divided into fixed size blocks including K 204×L 205 pixels. In one exemplary embodiment, the image blocks are rectangular including K=4 pixels 204 by L=4 pixels 205, i.e., four-by-four pixels blocks. In another embodiment, different arrangements are possible, e.g., arrangements in which image blocks include two-by-eight or eight-by-two pixels can be used.

Each pixel 201 within the image 200 may be in any variation of RGB or RGBA formats. However, different arrangements in the color format are also possible, e.g., in YUV format, if appropriate color conversions are performed prior to image encoding.

In one exemplary embodiment, each pixel 201 is 24-bits long including 8-bits for the red channel, 8-bits for the green channel, and 8-bits for the blue channel, i.e., the pixels are in R8G8B8 format. In another exemplary embodiment each pixel 201 is 16-bits long including 5-bits for the red channel, 6-bits for the green channel, and 5-bits for the blue channel, i.e., the pixels are in R5G6B5 format, with other formats being possible.

Figure 2B:
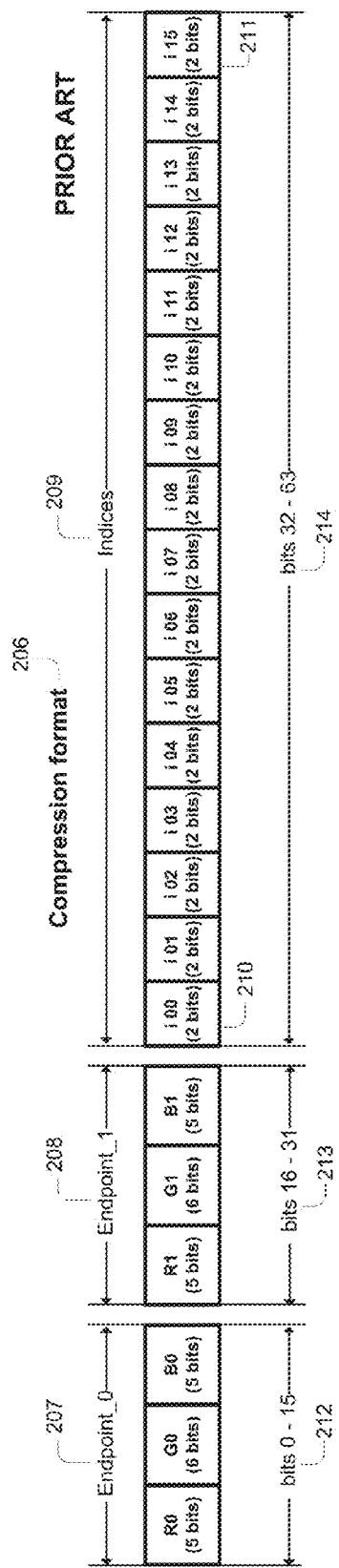
FIG. 2B illustrates the data fields of the DXT1 compression format.

A conventional block based, fixed rate compression scheme is DXTn, also referred as S3TC or DXTC, as suggested in U.S. Pat. No. 5,956,431. DXTn has been widely employed by common graphics standards, e.g., by OpenGL standard of the Khronos group. All variations of DXTn operate on four-by-four pixels image blocks. FIG. 2B illustrates the data fields of DXT1 format 206; an embodiment of the DXTn group of compression schemes. The DXT1 compression format includes 64-bits 212, 213, 214 for each compressed block. The compression format is divided into three fields. The fields 207 and 208 include two colors that are representative base colors of an image block. The representative base colors will be termed as endpoints hereafter. The colors are in R5G6B5 format i.e., each of the said colors is 16-bits long 212, 213. Based on the mode of operation, apart from the two endpoints, one or two additional colors are generated as the result of the linear interpolation between the two endpoints. The linear interpolation is performed using predefined weighted values.

The third field 209 includes 16×2-bit indices, that is, one 2-bit index for each pixel in the block. As a result, the third field is 32-bits long 214. The indices are ordered in the same order as in the pixels in the source block i.e., the index i00 210 corresponds to the "first" pixel in the block, i.e., the pixel residing in the top and left corner of an image block, while the index i15 211 corresponds to the "last" pixel in the block, i.e., the pixel residing in the bottom and right corner of an image block. The 2-bit index for each pixel is used to select among the three or four predefined colors i.e., the two endpoints and the one or two interpolated colors.

However, as in known in the art, DXTn compression schemes have numerous drawbacks, that is, there are specific image block arrangements in which DXTn compression results in poor image quality, such as low resolution representations, compression artifacts and/or aliasing. In addition, the compression process of DCTn as described in U.S. Pat. No. 5,956,431 is not well-suited to a hardware implementation.

Therefore, there is a need for methods that improve the accuracy of compressed images, both of RGB and transparency data, while reducing storage and memory bandwidth requirements, and encoding hardware complexities, while also compressing image data blocks into convenient sizes to maintain alignment for random accesses to one or more pixels in the compressed image.

Figure 3:
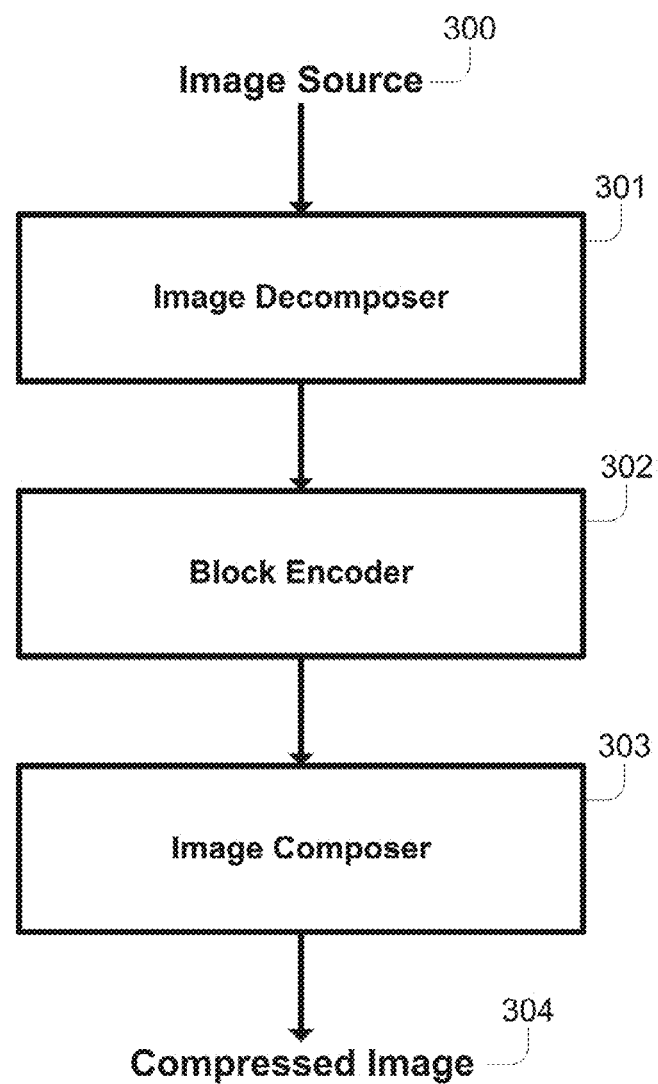
FIG. 3 illustrates a flow diagram of a compression system in accordance with one or more aspects disclosed herein.

In accordance with one compression method and as illustrated in FIG. 3, the image source 300 is forwarded to an Image Decomposer 301. The module splits the source image into a plurality of image blocks. The number of the derived image blocks is defined by the number of pixels in the source image. For example, if the source image has W pixels 202 in width and H pixels 203 in height, there will be (W×H)/(4×4) image blocks assuming that each image block is four-by-four pixels. However, different arrangements in image block shape are also possible, e.g., arrangements in which image blocks including two-by-eight or eight-by-two pixels can be used.

In one exemplary embodiment, the Image Decomposer module may operate in "sequential" mode. In another embodiment, the Image Decomposer module may operate in "parallel" mode. In the sequential mode, the module outputs one image block at a time e.g., one block in each GPU cycle. In the parallel mode, the said module outputs L image blocks at a time, e.g., L image blocks in each GPU cycle, where L is a positive integer number. For the example image 200, L is smaller or equal to (W×H)/(4×4).

The Block Encoder 302 receives one or more image blocks from Image Decomposer 301 for further data processing. The Block Encoder 302 encodes each received image block into a fixed size compressed form that is a lossy representation of a source image block. One or multiple Block Encoder modules 302 may coexist in a compression system and multiple Block Encoder modules may operate in parallel encoding different image blocks. The operation mode of the Image Decomposer module 301, either sequential or parallel, may define the number of Block Encoder modules 302 in the compression system.

In one exemplary embodiment, an Image Decomposer module 301 operating in sequential mode is coupled to one Block Encoder module 302 and there is only one Block Encoder module in the system. Those skilled in the art will recognize that the embodiment represents perhaps the most frugal arrangement, that is, the arrangement that results in minimal hardware costs and minimal die area. In another embodiment, an Image Decomposer module 301 operating in parallel mode, e.g., extracting L image blocks at a time, is coupled to L Block Encoder modules 302. In the embodiment, L image blocks will be encoded in parallel increasing compression throughput, but also increasing the hardware costs of the graphics processing system 100.

One or more Block Encoder modules 302 are coupled to an Image Composer module 303. The said Image Composer module 303 receives the one or more compressed image blocks and assembles the image blocks in a suitable order so as to produce the final compressed image 304. The compressed image blocks may be assembled in the same order as the one they have split from the Image Decomposer 301.

In one exemplary embodiment, the Image Composer 303 is also equipped with a memory interface unit and the memory interface unit may be configured by the 3D rendering unit 109 so as to store the compressed image blocks in a predefined destination, e.g., to an on-chip frame buffer or to an off-chip frame buffer or to a texture buffer. In one exemplary embodiment, the Image Composer 303 may submit the image blocks one-by-one to a predefined destination, e.g., via separate memory transactions. In another exemplary embodiment, multiple compressed image blocks may be submitted via a bulk memory transaction, e.g., via a Direct Memory Access command. Sometime later, the compressed image data may be decompressed by an Image Decoder module. The functionality of the said Image Decoder module is further described in relation to FIG. 9.

Figure 4:
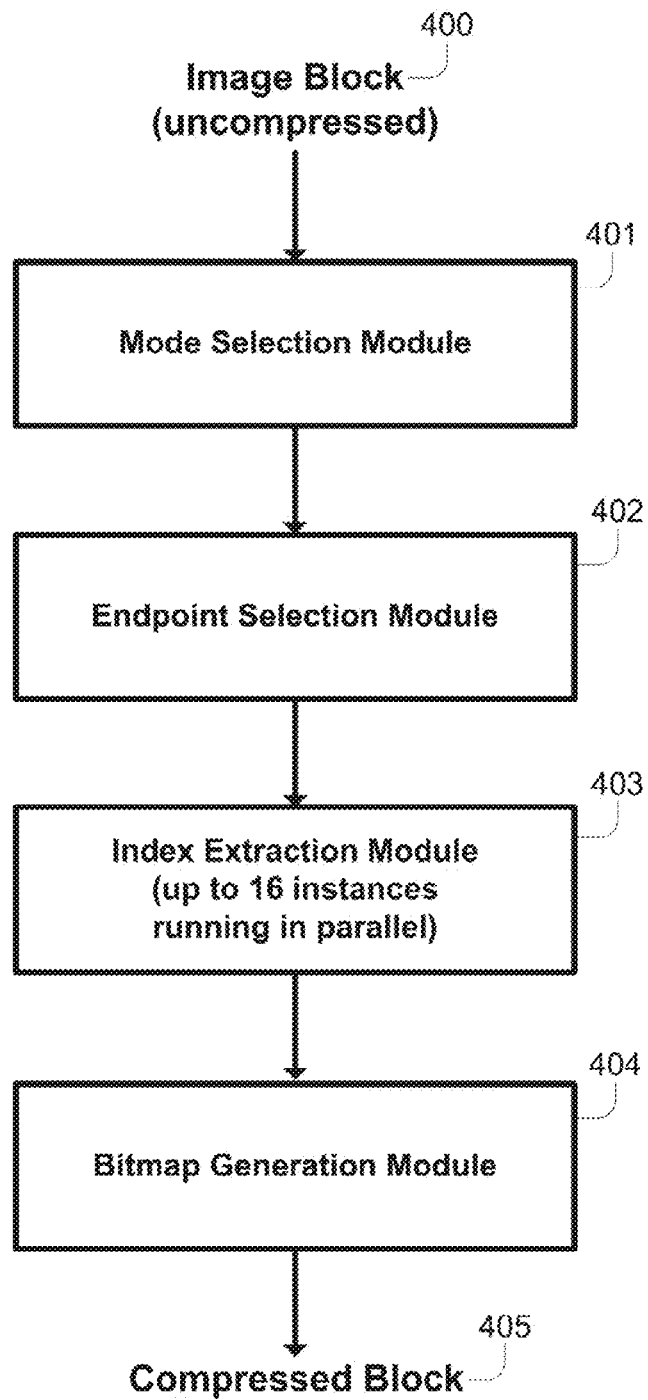
FIG. 4 illustrates an abstract flow diagram of an exemplary embodiment of a Block Encoder module in accordance with one or more aspects disclosed herein.

The operation of the Block Encoder 302 is further described in FIG. 4. In the exemplary embodiment illustrated in FIG. 4, a Block Encoder 302 includes a Mode Selection module 401, an Endpoint Selection module 402, one or more Index Extraction modules 403, and a Bitmap Generation module 404. The Mode Selection module 401 is coupled to the Endpoint Selection module 402. The Endpoint Selection module 402 is, in turn, coupled to the Index Extraction module 403. Further, the Index Extraction module 403 is coupled to a Bitmap Generation module 404 that produces the compressed blocks 405.

In accordance with one exemplary embodiment, the Block Encoder module 302 is used to compress color data e.g., R8G8B8 or R5G6B5 pixel data, of an image block 400. In a yet another embodiment, the Block Encoder may be coupled to a Transparency Encoder module for also encoding transparency, alpha data. The Transparency Encoder module is described in FIG. 12.

Figure 5:
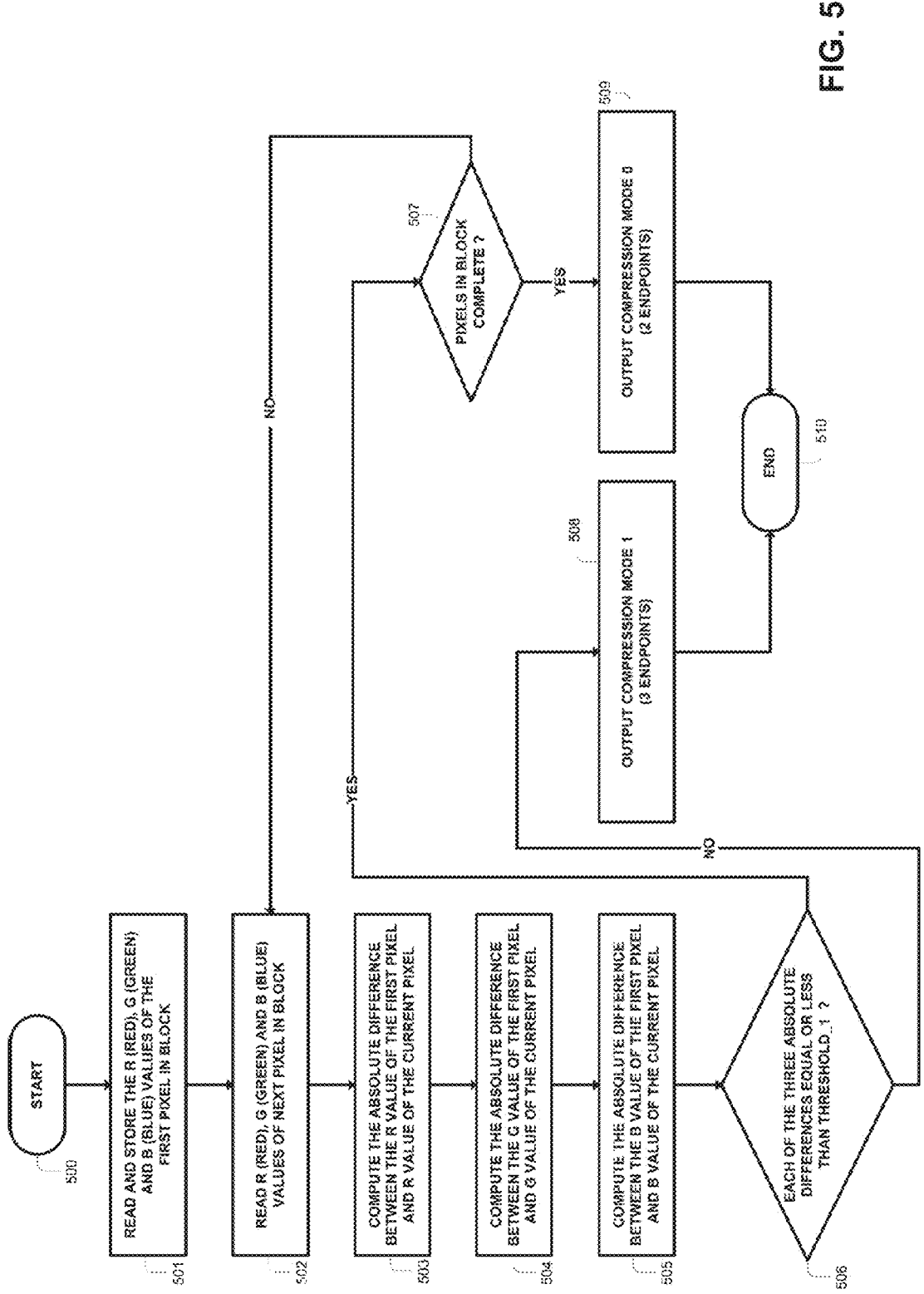
FIG. 5 illustrates an abstract flow diagram of an exemplary embodiment of a Mode Selection module in accordance with one or more aspects disclosed herein.

An embodiment of the Mode Selection module 401 is described in FIG. 5. An embodiment of the Endpoint Selection module 402 is described in FIGS. 6A and 6B. Furthermore, an embodiment of the Index Extraction module 403 is described in FIG. 7.

Is essence, block based, fixed rate compression methods formulate, inter alia, a bit allocation problem. The "critical" part of the compression paradigm is to parse the pixels of a source image block and extract respective components of the pixels, such as "color space information," "color index information," and "additional control information." The next step is to divide the available bits of the fixed size compressed form, i.e., of the encoded bit vector, among the three kinds of the derived information. The term "critical" is used herein to identify that this function defines to a large degree the loss in quality occurring during the lossy compression process.

The first type of the derived information called "color space information" refers to a set of RGB colors from which the colors assigned to image block pixels may be chosen. The colors comprising the set of colors will be termed as endpoints hereafter. More specifically, the selected endpoints may act as representative colors of the block that, in turn means, all pixels in the block will be mapped into the base colors or into specific colors inferred or interpolated from the selected base colors. In some prior art block based, fixed rate compression schemes, e.g., in DXTn schemes, the number of endpoints is constant and equal to two in all image blocks. As noted, the fixed number of endpoints in DXTn may lead to poor image quality especially in image blocks having multiple and different color hues.

The term "color index information" refers to a set of data values that may be used to associate individual block pixels with specific endpoints. The term "additional control information" refers to any kind of additional information inserted in the compressed form apart from the "color space information" and the "color index information." All the said terms are further described hereinafter.

In accordance with one exemplary aspect of the disclosed technology, the Mode Selection module 401, part of the Block Encoder 302, aims to identify the appropriate number of the base colors within a block. In particular, the Mode Selection module 401 outputs whether the encoding of a given image block should be performed using two (compression mode zero) or three (compression mode one) endpoints. Since the final compressed form includes only a limited and predefined range of bits intended to host the endpoints (either two or three), in the case of three endpoints, the endpoint representation will be done with low precision color data. In one embodiment, the compressed form contains 48-bits for the endpoints. In the embodiment, the Mode Selection module 401 will output if two R8G8B8 or three R5G6B5 endpoints should be used during the compression process. In another embodiment, the compressed form contains 24-bits for the endpoints. In the embodiment, the Mode Selection module 401 will output if two R4G4B4 or three R3G3B2 endpoints must be used.

FIG. 5 illustrates a flow diagram of an embodiment of the module. At the start 500 of the process, the RGB values of the "first" pixel of the image block are read 501. This pixel will be used as reference pixel hereafter. In an embodiment, the reference pixel can be the "first" pixel of the block i.e., the pixel residing in the upper leftmost part of the block. In another embodiment, the reference pixel may be any pixel in the image block.

The next step in FIG. 5 includes an iterative phase among all the others pixels in the block, except the "first" pixel. In the iterative phase, the color values of the remaining pixels are read 502 and compared with the first pixel 503, 504, 505. The comparison is performed in a per color channel basis. The result of the comparisons are the absolute arithmetic differences for the R channel 503, G channel 504, and B channel 505. If all the differences are equal or smaller than a given threshold THRESHOLD_1 506, the process continues to the next pixel 502 until all the pixels in the block are complete 507.

If all the computed absolute arithmetic differences, across the three color channels and across all the pixels in the block, except the first pixel, are smaller than the threshold THRESHOLD_1 506, then the compression mode is set to zero 509 and the Mode Selection module outputs that two endpoints should be used in the given image block. After this step, the process terminates 510.

In essence, mode zero compression may be translated as the case in which the colors of the pixels in an image block are relatively close in the color space, so there is no need for a third endpoint and, most importantly, the endpoints can be stored with higher precision. In other words, the value of threshold THRESHOLD_1 formulates a "bounding box" around the "first" pixel in the color space and in mode zero compression, the color values of the block pixels are inside this "bounding box".

To the contrary, in the iterative process illustrated in FIG. 5, if one of the computed absolute arithmetic differences is greater than the threshold THRESHOLD_1 506, then the compression mode is set to one 508 and the Mode Selection module outputs that three endpoints should be used in the given image block. However, the representation of the endpoints in the compressed form will be done with lower precision color data compared to mode zero.

In essence, mode one compression is suitable for image blocks in which three distinct, saturated colors coexist in an image block. In such block arrangements, using two endpoints may not accurately represent the colors of the original image. This is because blending two of the three colors may not produce the third color. As known by those skilled in the art, the case results in visual artifacts, if prior art block based compression scheme, e.g., in DXTn schemes, is to be used.

Threshold THRESHOLD_1 can be either static, i.e., predetermined or adaptive. Of course, THRESHOLD_1 value should be set in a way to reduce the visual artifacts inserted by the compression process. In one exemplary embodiment, the THRESHOLD_1 value is predefined and remains constant during the operation of the system. In the embodiment, the exact value of THRESHOLD_1 is a subject under optimization, e.g., via profiling and should be identified after analyzing various other parameters of the graphics system, such as, but not limited to, the depth of color data in the source image and/or the functionality of the display controller e.g., if an anti-aliasing algorithm exists.

The applicants want to clarify that the embodiment of the Mode Selection module as illustrated in FIG. 5 is amenable to improvements. More complex algorithms and practices may be used to select a compression mode and relying on the said improved algorithms and practices may decrease the image quality loss introduced due to the compression process. For example, algorithms based on principal components analysis (PCA) or in curve generation techniques may be used. However, as will be recognized by those skilled in the art, the embodiment depicted in FIG. 5 requires simple computations, such as subtractions, that can be completed in a relatively small number of GPU cycles, thereof the embodiment is well suited for a low die area hardware implementation while maintaining the required accuracy.

Figure 6A:
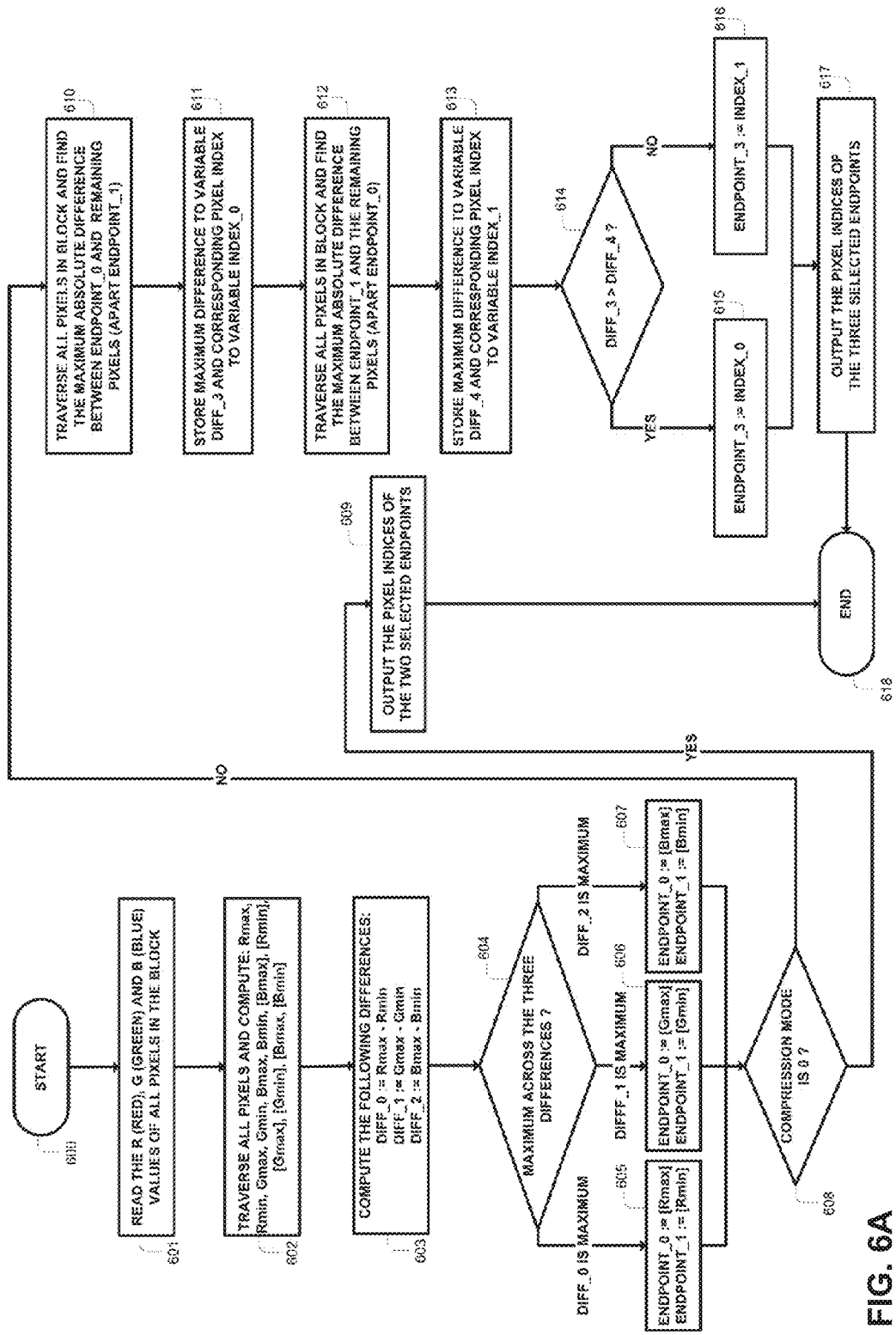

In accordance with one exemplary embodiment, the Endpoint Selection module 402 receives configuration information from the Mode Selection module 401. The Endpoint Selection module 402 operates to identify two or three color values, depending on the output of the Mode Selection module that will act as endpoints. In a particularly exemplary embodiment, the endpoints are a subset of the pixels in an image block, that is, the endpoints are selected from the pixels in the block. FIG. 6A illustrates a flow diagram of a particularly exemplary embodiment of the Endpoint Selection module 402. FIG. 6B presents a list with the terminology used in the flow diagram of FIG. 6A.

At the start 600 of the process, the RGB values of all the pixels in an image block are read 601. The next step in the process is to traverse the color data of the pixels in the block and compute 602 the following values Rmax 620, Rmin 621, Gmax 622, Gmin 623, Bmax 624, Bmin 625 and the following indices [Rmax] 626, [Rmin] 627, [Gmax] 628, [Gmin] 629, [Bmax] 630, [Bmin] 631. The notation of the color channel values and indices is provided in FIG. 6B.

Once this step is done, three absolute differences are calculated 603 and the maximum difference among them is selected 604. The three absolute differences are as follows:

$$DIFF\_0 := R\text{max} - R\text{min}; \quad (1)$$

$$DIFF\_1 := G\text{max} - G\text{min}; \quad (2)$$

$$DIFF\_2 := B\text{max} - B\text{min}; \quad (3)$$

The pixel pair corresponding to the maximum difference formulates the two endpoints of an image block as is illustrated in FIG. 6A 605, 606, 607. More specifically, if one assumes that the maximum absolute difference is DIFF_0 (equation 1), then the two selected endpoints are [Rmax] 626 and [Rmin] 627, where [Rmax] and [Rmin] are the two pixels with red channel equal to Rmax and Rmin, respectively. In addition, in the case that the Rmax or Rmin correspond to two or more pixels, then a random selection among the said pixels may be performed. Obviously, similar operations may occur if DIFF_1 (equation 2) or DIFF_2 (equation 3) are the maximum absolute differences.

In the current embodiment of FIG. 6A, if the compression mode has been set to zero 608, then the indices of the two selected endpoints are forwarded 609 to the next module and the process terminates 618.

To the contrary, if the compression mode has been set to one, an iterative phase among all the other pixels in the block begins (except the two selected endpoints). The target of the iterative phase is to select the third endpoint. In essence, the third endpoint may be a pixel where its color data is distant in the color space from the two selected endpoints. Again, the applicants want to state that in the current embodiment the endpoints are selected from the pixels of the source image block. The iteration phase is divided into two subphases and each subphase includes an iterative process among all the pixels in the image block (except the two selected endpoints).

In the first subphase 610, 611 one goal of the iterative process is to seek for the maximum distance in the color space between the selected Endpoint_0 and the remaining pixels in a block, except Endpoint_1, 610. Once the distance, notated as DIFF_3 in FIG. 6A, is found, the pixel index, notated as INDEX_0 in FIG. 6A, corresponding to the distance is stored 611. Similarly, in the second subphase 612, 613 one goal of the iterative process is to seek for the maximum distance in the color space between the selected Endpoint_1 and the remaining pixels in the block, except Endpoint_0, 612. Once the distance, notated as DIFF_4 in FIG. 6A, is found, the pixel index, notated as INDEX_1 in FIG. 6A, corresponding to the distance is stored 613.

Once DIFF_3, DIFF_4, INDEX_0, and INDEX_1 are computed, the third endpoint is defined by the arithmetic relation between DIFF_3 and DIFF_4 614. If DIFF_3 is greater than DIFF_4 614, the third endpoint is the pixel corresponding to INDEX_0 615. To the contrary, if DIFF_3 is less or equal to DIFF_4 614, the third endpoint is the pixel corresponding to INDEX_1 616. After the selection of the third endpoint is done, the selection is forwarded 617 to the next module and the process illustrated in FIG. 6A terminates 618.

The distance between two pixels as required in 610 and 612 may be computed in various ways. In one exemplary embodiment, the distance among the color values of the two pixels is computed by calculating the absolute differences between the two color values on a per channel basis; three absolute differences in total. Once this step is complete, the distance is formulated by the summary of the three computed absolute differences. Different, more complex arrangements for computing the distance may be used, e.g., by translating the RGB pixel data in a suitable luminance-chrominance color format and computing the said distance in the luminance-chrominance color space using appropriate weight factors. However, as will be recognized by those skilled in the art, the exemplary embodiment for calculating the color distances requires simple computations, such as subtractions, that can be completed in a relatively small number of GPU cycles, thereof the embodiment is well suited for a low die area hardware implementation while maintaining the required accuracy.

Again, the exemplary embodiment of the Endpoint Selection module as illustrated in FIG. 6A is amenable to improvements. More complex algorithms and practices may be used to select the endpoints and relying on those algorithms and practices may decrease the image quality loss introduced due to the compression process. For example, the endpoints may not be "selected" from pixels of the image block, but they can be "calculated" using an appropriate mathematic procedure as the one as suggested in U.S. Pat. No. 5,956,431, which is incorporated herein by reference in its entirety. However, as will be recognized by those skilled in the art, the embodiment depicted in FIG. 6A requires simple computations, such as subtractions or the like, that can be completed in a relatively small number of GPU cycles, thereof the embodiment is well suited for a low die area hardware implementation while maintaining the required accuracy.

Once the compression mode and the endpoints are selected, the next step is to compute the "color index information." The information refers to a set of data values, in the form of indices, that may be used to associate the individual pixel blocks with specific endpoints or colors inferred or interpolated from the selected endpoints. The term "quantized color points" (QCP) will be used hereafter to describe the endpoints and the colors inferred from the selected endpoints. The target is to seek for every pixel in the block an index that will map a pixel to a particular QCP. Obviously, the mapping process should be done in a manner to decrease the quality loss introduced by the compression process.

In accordance with one embodiment, the quantized color points in mode zero compression are defined as follows:

first quantized color point: $QCP\_1 := Endpoint\_0$; (4)

second quantized color point: $QCP\_2 := (1/8) Endpoint\_0 + (7/8) Endpoint\_1$; (5)

third quantized color point: $QCP\_3 := (2/8) Endpoint\_0 + (6/8) Endpoint\_1$; (6)

fourth quantized color point: $QCP\_4 := (3/8) Endpoint\_0 + (5/8) Endpoint\_1$; (7)

fifth quantized color point: $QCP\_5 := (4/8) Endpoint\_0 + (4/8) Endpoint\_1$; (8)

sixth quantized color point: $QCP\_6 := (5/8) Endpoint\_0 + (3/8) Endpoint\_1$; (9)

seventh quantized color point: $QCP\_7 := (7/8) Endpoint\_0 + (1/8) Endpoint\_1$; (10)

eighth quantized color point: $QCP\_8 := Endpoint\_1$; (11)

The QCPs presented in equations (4), (5), (6), (7), (8), (9), (10), and (11) are eight in total, thus a 3-bit index is required for each pixel in the block for a total of 48-bits for the entire block. In one exemplary embodiment, the endpoint format in mode zero compression is 24-bits, 8-bits per color channel, and all the calculations in the equations (4), (5), (6), (7), (8), (9), (10), and (11) are performed in the color format. In another exemplary embodiment, the endpoint format in mode zero compression is 12-bits long, 4-bits per color channel, and all the calculations in equations (4), (5), (6), (7), (8), (9), (10), and (11) are performed in the color format.

Those skilled in the art will recognize that that the higher precision used in mode zero compression may reduce undesirable visual effects in the compressed blocks as opposed to prior art block based, fixed rate compression schemes, such as in DXTn scheme. The undesirable visual effects may appear as noise in color gradients, also known as blocking effect noise.

In addition, the quantized color points in mode one compression are defined as follows (note that in mode one compression, three quantized points are selected):

first quantized color point: $QCP\_1 := Endpoint\_0$; (12)

second quantized color point: $QCP\_2 := (2/3) Endpoint\_0 + (1/3) Endpoint\_1$; (13)

third quantized color point: $QCP\_3 := (1/3) Endpoint\_0 + (2/3) Endpoint\_1$; (14)

fourth quantized color point: $QCP\_4 := Endpoint\_1$; (15)

and fifth quantized color point: $QCP\_5 := (1/2) Endpoint\_0 + (1/2) Endpoint\_2$; (16)

sixth quantized color point: $QCP\_6 := (2/3) Endpoint\_0 + (1/3) Endpoint\_2$; (17)

seventh quantized color point: $QCP\_7 := (1/3) Endpoint\_0 + (2/3) Endpoint\_2$; (18)

eighth quantized color point: $QCP\_8 := Endpoint\_2$; (19)

The QCPs presented in equations (12), (13), (14), (15), (16), (17), (18), and (19) are eight in total, thus, again, a 3-bit index is required for each pixel in the block for a total of 48-bits for the entire block. The quantized color points are divided into two groups. The first group includes equations (12), (13), (14), and (15) and Endpoint_0 and Endpoint_1 act as representative base colors in the block. The second group includes equations (16), (17), (18), and (19) and Endpoint_0 and Endpoint_2 act now as representative base colors in the block.

Again, since the quantized color points are eight in total, a 3-bit index is required for each pixel in the block for a total of 48-bits for the entire block. However, in the mode one compression, the index bits are divided into two categories: 1-bit is used to selected the endpoint pair (either the Endpoint_0 and Endpoint_1 pair or the Endpoint_0 and Endpoint_2 pair) and 2-bits are used to select a specific quantized color point in each pair; either one of equations (12), (13), (14), and (15) (corresponding to the first endpoint pair) or one of equations (16), (17), (18), and (19) (corresponding to the second endpoint pair).

In one exemplary embodiment, the endpoint format in mode one compression is 16-bits, e.g., in R5G6B5 format, and all the calculations in equations (12), (13), (14), (15), (16), (17), (18), and (19) are performed in the said format. In another exemplary embodiment, the endpoint format in mode one compression is 8-bits, e.g., in R3G3B2 format, and all the calculations in equations (12), (13), (14), (15), (16), (17), (18), and (19) are performed in the format. The low precision of the endpoints in compression mode one may not lead to poor image quality in the compressed image blocks compared to some prior art compressing schemes, like the DXTn scheme, since compression mode one is selected in image blocks having multiple different color hues within the block.

Figure 7:
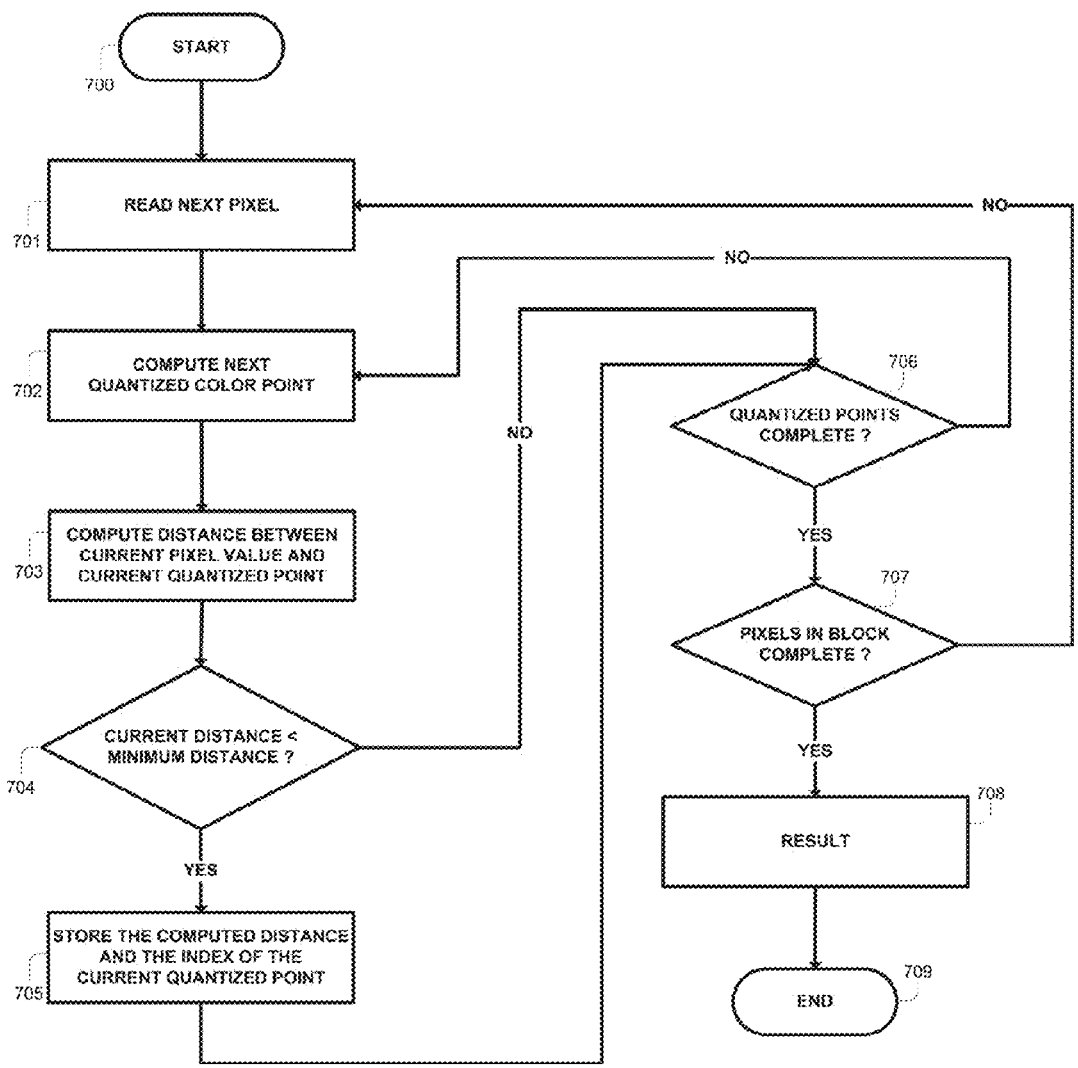
FIG. 7 illustrates an abstract flow diagram of an exemplary embodiment of an Index Extraction module in accordance with at least two aspects disclosed herein.

In accordance with one embodiment, FIG. 7 illustrates a flow diagram of an embodiment of the Index Extraction module 403. At the start 700 of the process, the RGB values of the "first" pixel in the image block are read 701. In one exemplary embodiment, the first pixel is the pixel residing in the upper leftmost part of the block. In an alternative embodiment, the first pixel may be any pixel in the block. Note that the Index Extraction module 403 can be configured with the selected compression mode by the Mode Selection module 401. Note also that the Index Extraction module 403 can be configured by the Endpoint Selection module 402 regarding the selected endpoints (either two or three).

The next step in the process depicted in FIG. 7 includes an iterative phase among all QCPs. In the iterative phase, the RGB values of a QCP are computed 702 and the distance between the current pixel and the QCP is calculated 703. If the computed distance is the first computed distance, it is stored; for clarity, the operation is not shown in FIG. 7. Otherwise, the computed distance is stored 705 only if it is smaller than the previously stored computed distance 704. For each stored distance, the index to the corresponding QCP is also stored 705. The iterative phase continues to next QCP 702 until all QCP are complete 706.

In essence, the iterative phase seeks to find the QCP (and stored its index 705) then minimizes the distance between a source pixel and a QCPs of the selected compression mode.

The process illustrated in FIG. 7 continues to the next pixel 701 until all pixels in the block are complete 707. After this step, the result, i.e., the computed indices of all pixels in an image block are forwarded 708 to the next module and the process terminates 709.

The output of the Index Extraction module 403 is a 3-bit index for each pixel in an image block; thus 16×3-bits in total. The number of QCP is the same and equal to eight in both compression modes. The output of the Index Extraction module 403 is forwarded to Bitmap Generation module 404.

In an alternative embodiment, multiple instances, up to 16, of the Index Extraction modules 403 may be included in the graphics processing system 100. In the embodiment, each instance may operate in parallel in a different pixel or a group of pixels increasing compression throughput, but also increasing the hardware costs of the graphics processing system 100.

As will be recognized by those skilled in the art, the exemplary embodiment depicted in FIG. 7 requires simple computations, like additions, subtractions, comparisons, and shift operations, or the like, that can be completed in a relatively small number of GPU cycles—especially in fixed point arithmetic, thereof the embodiment is well suited for a low die area hardware implementation.

The Bitmap Generation module 404 receives the selected compression mode from the Mode Selection module 401, the selected endpoints from the Endpoint Selection module 402, and the indices for all pixels in a block from the Index Extraction module 403. Upon the information being ready, the Bitmap Generation module 404 constructs the final compressed form of an image block, i.e., the encoded bit vector, by ordering the information in a preferred arrangement. Further, "additional control information" may be encoded in the final compressed form. A particular example of the additional control information is a technique for encoding the compression mode in the encoded bit vector.

Figure 8A:
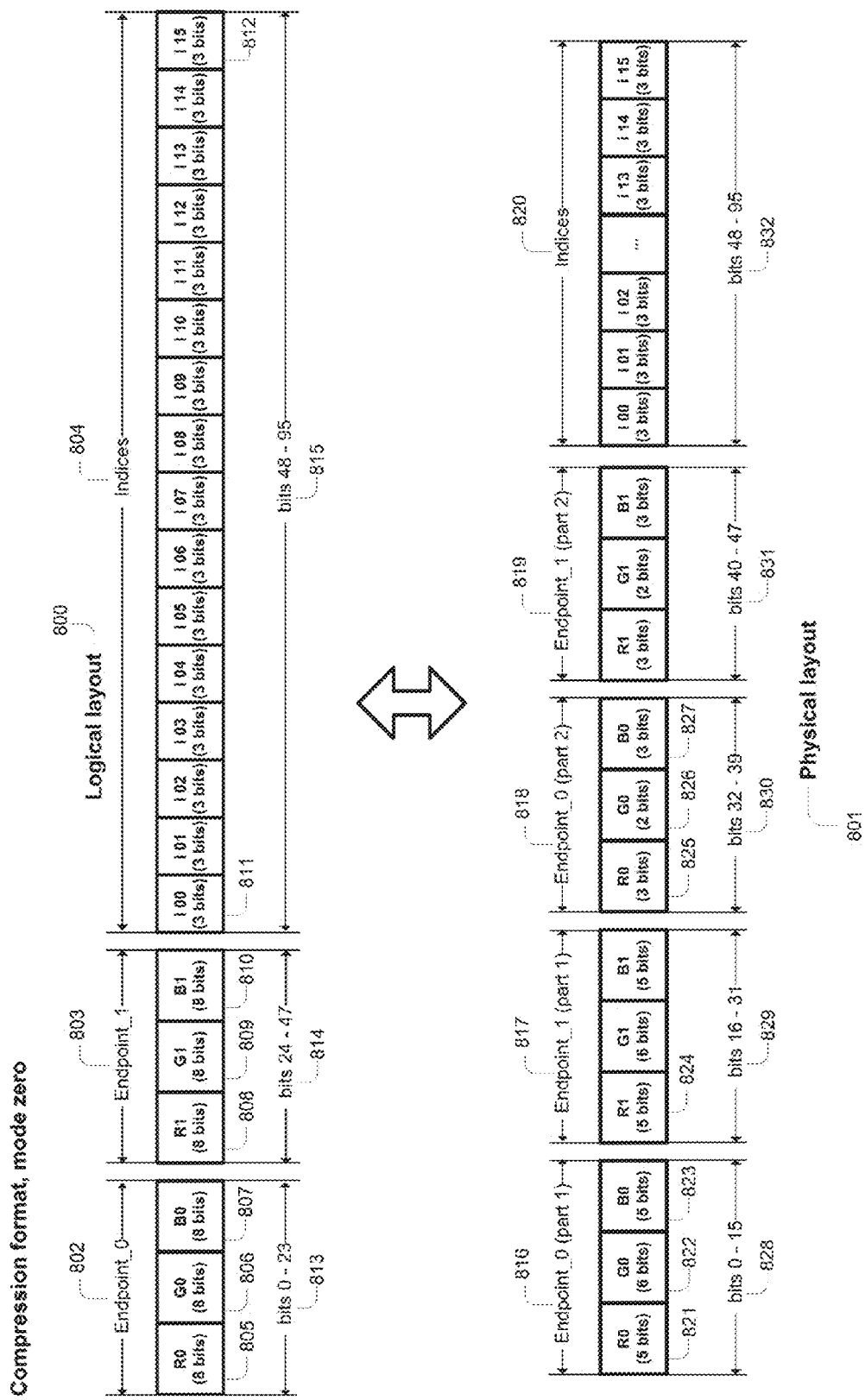
FIGS. 8A and 8B illustrate the data fields of a compression form of a particularly preferred embodiment of the image compression methods disclosed herein.
Figure 8B:
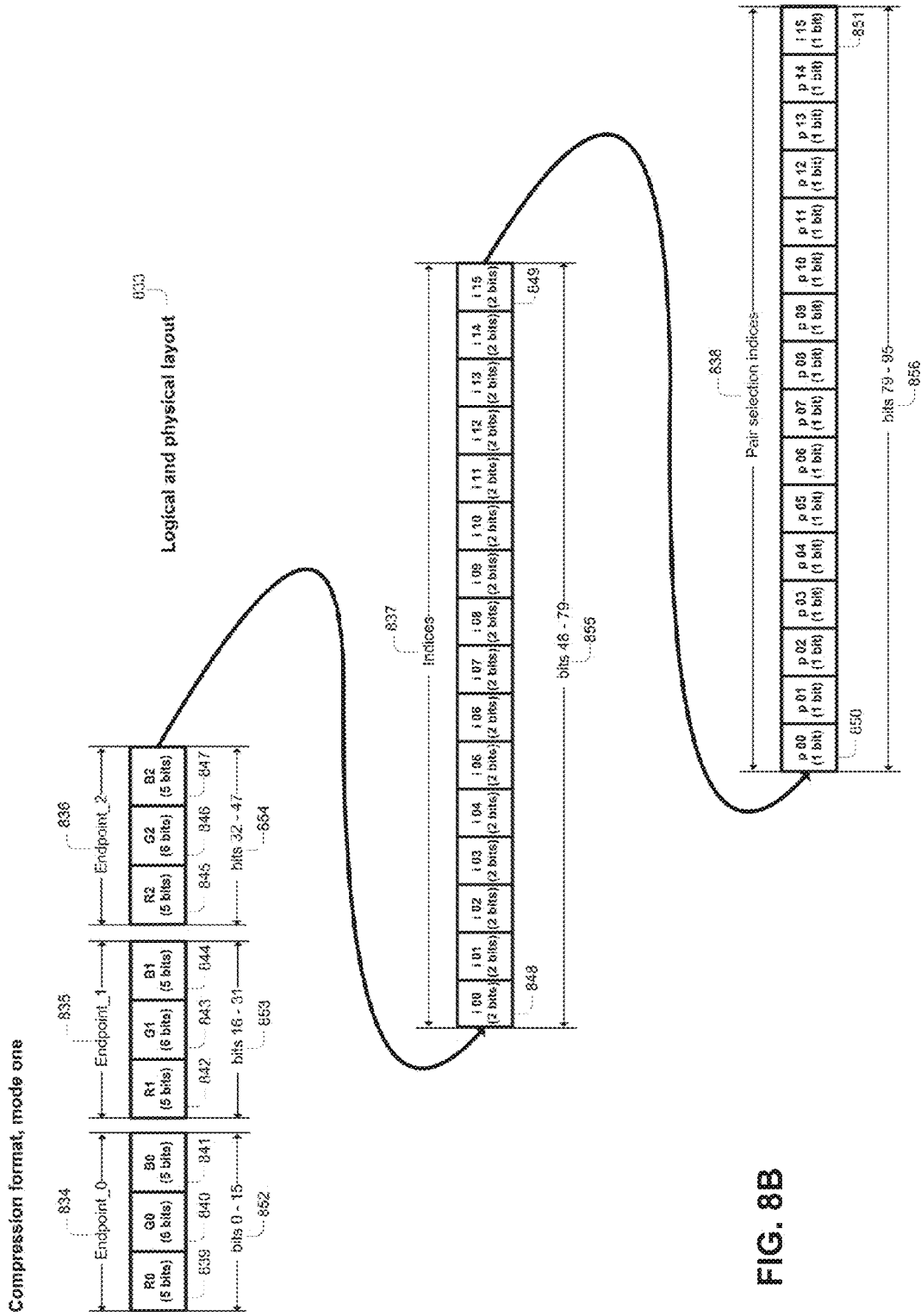

FIGS. 8A and 8B show detailed diagrams of exemplary bit sequences representing an encoded image block in accordance with an exemplary embodiment. FIG. 8A depicts the encoded bit vector of mode zero compression 800, 801 and FIG. 8B depicts the encoded bit vector of mode one compression 833. A method for decoding the compression mode is described in FIG. 9. Further, FIG. 8A presents both the logical representation 800 and the physical layout 801 of the encoded bit vector according to mode zero compression. For mode one compression, depicted in FIG. 8B, the logical and physical representations 833 are identical.

In the embodiment, each encoded image block is 96-bits long. The arrangement in FIG. 8A includes three separate bit fields. In the first 802 and second 803 field, two 24-bit long QCP are stored 813, 814. Note that 8-bits per color channel are stored for each endpoint in the said compression mode 805, 806, 807, 808, 809, 810.

The arrangement 800 also includes a third field 804 that contains 16×3-bit indices (48-bits in total 815). As noted, there is a 3-bit index for each pixel of an image block and the said index is used to select one of the eight QCPs as described in equations (4), (5), (6), (7), (8), (9), (10), and (11). In the arrangement, the index 811 may correspond to upper leftmost pixel in a four-by-four pixels image block. Similarly, the index 812 may correspond to the lower rightmost pixel in an image block.

The physical layout 801 is constructed by the logical layout 800 after performing a re-ordering in the bits in the compressed form. Note that the number of bits for representing either the endpoints or the indices remains exactly the same as in 800.

In particular, the numerical representation of Endpoint_0 is split into two fields where the first field is in R5G6B5 format 816, 828 and the second field is in R3G2B3 format 818, 830. The numerical value of R8G8B8 Endpoint_0 may be constructed by appropriately concatenating the two said fields 828, 830 in a per-color channel basis, i.e., to concatenate 821 and 825 to construct 805, to concatenate 822 and 826 to construct 806, and to concatenate 823 and 827 to construct 807. Similar operations are required for Endpoint_1 817, 818, albeit in different bit positions in the bit vector 829, 831. The field of indices 820 in 801 remains unaffected and as in 804.

As noted, FIG. 8B illustrates the logical and the physical layout 833 of the encoded bit vector according to mode one compression of the embodiment. In contrast to arrangement 800, the arrangement 833 includes five separate bit fields. In the first 834, second 835, and third field 836, three 16-bits long QCP are stored 852, 853, 854. In the said arrangement and for each endpoint, 5-bits are used for the red channel 839, 842, 844, 6-bits are used for the green channel 840, 843, 846, and 5-bits are used for the blue channel 841, 844, 847.

Further, in the arrangement, the fourth field 837 contains 32-bits 855 and the fifth field 838 contains 16-bits 856. In the fifth field, there is one bit per pixel and this bit may define the pair of the endpoints that could be used to calculate a QCP for a corresponding pixel. If this bit is clear, i.e., zero, the Endpoint_0 834 and Endpoint_1 835 will be used, i.e., one of the QCPs calculated by equations (12), (13), (14), and (15). If the bit is set, i.e., one, the Endpoint_0 834 and Endpoint_2 836 will be used, i.e., one of the QCPs calculated by equations (16), (17), (18), and (19). Once the endpoint pair is chosen, the corresponding 2-bit index in the fourth field is used to drive a selection among the equations (12), (13), (14), and (15) (if the corresponding pixel bit in fifth field is clear) or among the equations (16), (17), (18), and (19). Again the order of the 2-bit and 1-bit indices in the fourth and the fifth fields respectively may follow the normal order of the pixels in the image block. For example, the 2-bit index 848 and the 1-bit index 850 may point to upper leftmost pixel in a four-by-four pixels image block. Similarly, the 2-bit index 849 and the 1-bit index 851 may point to the lower rightmost pixel in the input block.

Those skilled in the art will recognize that the embodiment of 96-bit compressed form illustrated in FIGS. 8A and 8B is suitable for source images with high color depths. For example, images generated with 24-bits true color format, i.e., R8G8B8, or even higher color depths e.g., R10G10B10. However, the said embodiment may be also used in images with lower color depths, e.g., R7G7B7.

Figure 10A:
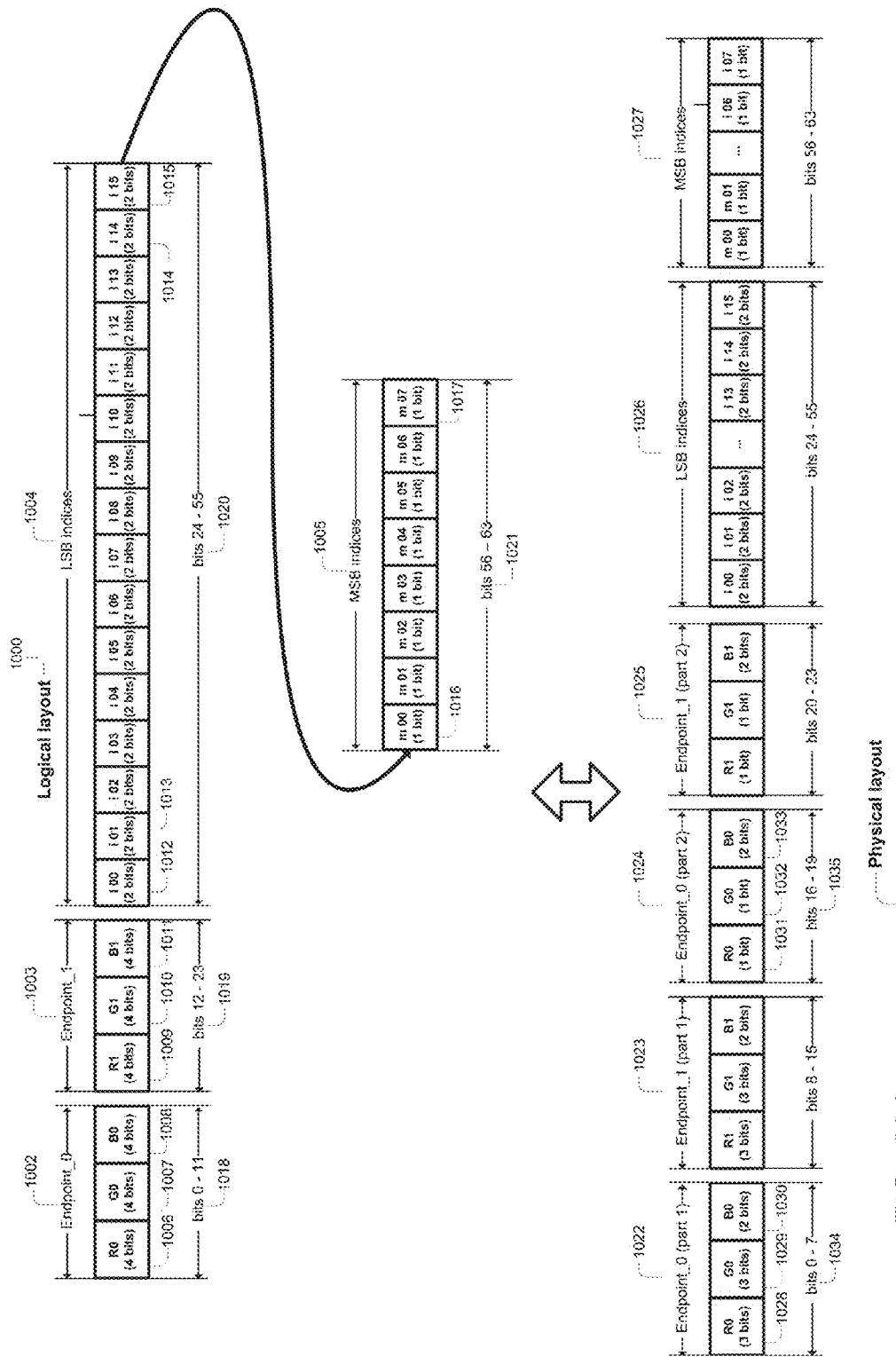
FIGS. 10A and 10B illustrate the data fields of a compression form of another particularly preferred embodiment of the image compression methods disclosed herein.
Figure 10B:
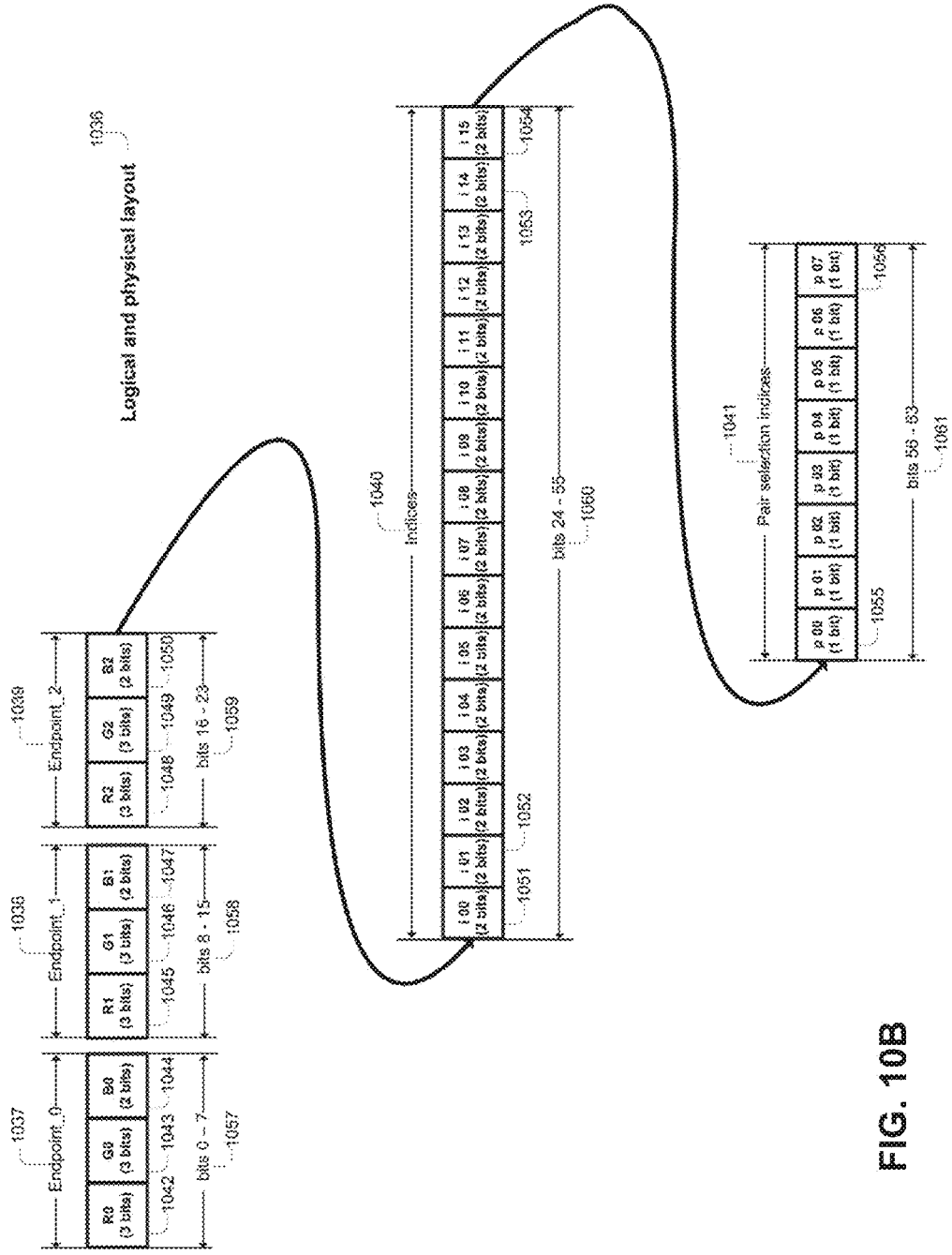

The suitability of the embodiment illustrated in FIGS. 8A and 8B with respect to the depth of the source color data is a subject under optimization, e.g., via profiling, and should be identified after analyzing various other parameters of the graphics processing system, such as, but not limited to, the arithmetic precision used in rendering logic, the resolution and the color depths supported by the display, and/or the functionality of the display controller e.g., if an anti-aliasing algorithm exists. Further, FIGS. 10A and 10B illustrate another exemplary embodiment that may be effective for source images with lower color depths, e.g., images generated with R5G6B5 or R4G4B4 color format.

In the exemplary embodiment illustrated in FIGS. 8A and 8B, if the color depth of an input image is higher than R8G8B8, e.g., R10G10B10, the encoding of the endpoints in R8G8B8 or R5G6B5 format may be performed by truncating the appropriate number of the least significant bits, i.e., the bits in the right part of the bit vector that represents a color channel value. To the contrary, if the color depth of the input images is lower than R8G8B8, e.g., R6G6B6, the encoding of the endpoints in R8G8B8 format may be performed by replicating the appropriate number of the most significant bits, i.e., the bits in the right part of the bit vector that represents a color channel value and concatenating them with the initial bit vector of the color value. It is understood that the process can be performed in a per-channel level.

Figure 9:
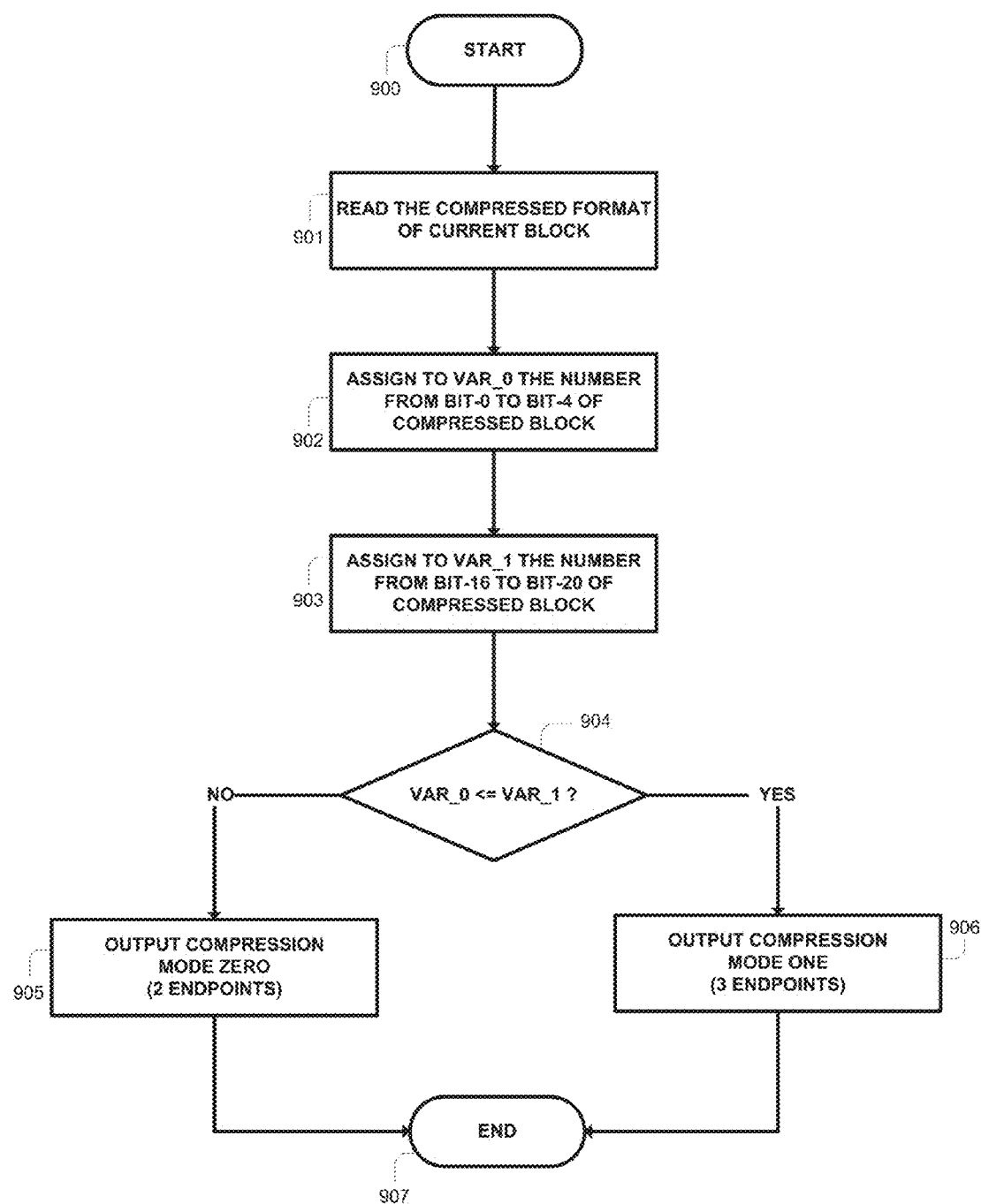
FIG. 9 illustrates an abstract flow diagram of an exemplary embodiment of a Mode Detector module in accordance with one or more aspects disclosed herein.

FIG. 9 illustrates a flow diagram of an embodiment of a Mode Detector module. Given an input compressed form, i.e., given an encoded bit vector, the module may output the compression mode used in the input compressed form. At the start 900 of the process, the input encoded bit vector is read 901. The next steps are to assign the numerical value of two specific parts, i.e., bit ranges, of the input bit vector into two variables. In accordance to the embodiment illustrated in FIGS. 8A and 8B, the numerical value stored in bits 0 till 4, 5-bits in total, is assigned to VAR_0 902. Similarly, the numerical value stored in bits 16 till 20, again 5-bits in total, is assigned to VAR_1 903.

Comparing the numerical values of VAR_0 and VAR_1 reveals the compression mode 904. Note that in both physical arrangements illustrated in 8A and 8B, the bit ranges, i.e., the range from bit 0 till bit 4, 821 in FIG. 8A and 839 in FIG. 8B, and the range from bit 16 till bit 20, 824 in FIG. 8A and 841 in FIG. 8B, contains the five most significant bits of the red channel of Endpoint_0 and Endpoint_1 respectively. In other words, the bit position arrangement remains intact irrespectively of the selected compression mode.

To continue, the numerical values of VAR_0 and VAR_1 are compared 904. If VAR_0 is equal or less then VAR_1, then the compression mode is set to zero 905, i.e., two endpoints. To the contrary, if VAR_0 is greater than VAR_1, then the compression mode is set to one 906, i.e., three endpoints. After the comparison is done, the Mode Detector module outputs the compression mode and the process terminates 907. Further, although the functionality of the Mode Detection module is described with respect to the red channel, the remaining channels, e.g., the green or blue channel can be used in a similar manner in an alternative embodiment of the module.

It is to be understood that the Mode Detector module functions as a hardware comparator taking as input specific bit positions of the compressed bit vector and extracting a hardware signal referencing the associated compressing mode of an encoded image block. The module may be part of an Image Decompression module, that is, a module that may be used to decompress the images compressed with the set of compression methods disclosed herein.

FIGS. 10A and 10B show detailed diagrams of bit sequences representing an encoded image block in accordance with another exemplary embodiment. More specifically, FIG. 10A depicts the encoded bit vector of mode zero compression 1000 and FIG. 10B depicts the encoded bit vector of mode one compression 1036. Further, FIG. 10A presents both the logical view 1000 and the physical layout 1001 of the encoded bit vector according to mode zero compression. For mode one compression, the logical and physical representations are identical.

In the embodiment, each encoded image block is 64-bits long. The arrangement 1000 includes four separate bit fields. In the first 1002 and second 1003 field, two 12-bit QCP are stored 1018, 1019. Note that 4-bit per-color channel information is stored for each endpoint in the compression mode 1006, 1007, 1008, 1009, 1010, 1011. In contrast to the arrangement 800 in FIG. 8A, the arrangement 1000 includes one additional field. The field 1004 contains 16×2-bit indices (32-bits in total 1020) and the field 1005 contains 8×1-bit indices (8-bits in total 1021).

More specifically, each 2-bit index in field 1004 corresponds to a different pixel in an image block i.e., 16×2-bit indices for a number of 16 pixels. In the arrangement, the index 1012 may correspond to the upper leftmost pixel in a four-by-four pixels image block. Similarly, the index 1015 may correspond to the lower rightmost pixel in an input block.

However, due to limited number of bits in the compressed bit vector 1000, a grouping technique can be employed in the representation of the information residing in field 1005. In particular, each 1-bit index in field 1005 corresponds to two adjacent pixels in an image block, i.e., groups of two pixels are created. In one exemplary embodiment, the groups of pixels are created following a horizontal fashion. For example, the 1-bit index 1016 may correspond to the two leftmost pixels residing in the first row of a four-by-four pixels image block. In other words, the index 1016 of field 1005 is associated with indices 1012 and 1013 of field 1004. Similarly, the index 1017 of field 1005 is associated with indices 1014 and 1015 of field 1004.

The indices of fields 1004, 1005 are concatenating in order to formulate a 3-bit index that may be used to select one of the eight QCPs as described in equations (4), (5), (6), (7), (8), (9), (10), and (11). A preferred policy to construct the said 3-bit indices is described hereafter.

The eight QCPs are divided into two groups. The first group may include the four QCPs calculated in equations (4), (5), (6), and (7). The second group may include the four QCPs calculated in equations (8), (9), (10), and (11). Thereof, a 1-bit index of field 1005 may be used to select one of the two groups. It can be understood that in accordance with the present embodiment, pixels belonging to the same pixel group, as defined by the 1-bit index of field 1005, are forced to use the same group of QCPs, i.e., either the one defined by equations (4), (5), (6), and (7) or the one defined by equations (8), (9), (10), and (11).

To continue, a 2-bit index of field 1004 is then used to select a particular QCP among the four QCPs included in the group of QCPs selected by the corresponding 1-bit index residing in field 1005.

The physical layout of the arrangement 1001 is constructed by the corresponding logical layout 1000 after performing a re-ordering of the bits in the compressed form. Note that the total number of bits for representing either the endpoints or the indices in the physical layout 1001 remains exactly the same as in 1000.

More specifically, Endpoint_0 is stored into two fields where the first field is in R3G3B2 format 1022 and the second field is in R1G1B2 format 1024. The numerical value of Endpoint_0 may be constructed by appropriately concatenating the two fields 1034 and 1035 in a per-color channel basis, i.e., to concatenate 1028 and 1031 to construct 1006, to concatenate 1029 and 1032 to construct 1007, and to concatenate 1030 and 1033 to construct 1008. Similar operations are required for Endpoint_1, albeit in different bit positions within the encoded bit vector 1023, 1025. The field of indices 1026 and 1027 remains unaffected as in 1004 and 1005, respectively.

As noted, FIG. 10B illustrates the logical and the physical layout 1036 of the encoded bit vector according to mode one compression of the embodiment. The arrangement 1036 includes five separate bit fields. In the first 1037, second 1038, and third 1039 field, three 8-bits long QCPs are stored 1057, 1058, 1059; 3-bits for the red channel 1042, 1045, 1048, 3-bits for the green channel 1043, 1046, 1049, and 2-bits for the blue channel 1044, 1047, 1050. Further, the fourth field 1040 contains 32-bits 1060 and the fifth field 1041 contains 8-bits 1061.

Similar to at least two arrangements of the present invention, each 2-bit index in field 1040 corresponds to a different pixel in an image block i.e., 16×2-bit indices for 16 pixels. In the arrangement, the index 1051 may correspond to the upper leftmost pixel in a four-by-four pixels image block. Likewise, the index 1054 may correspond to the lower rightmost pixel in an image block.

As in arrangement 833, the bits in field 1041 may be used to define a pair of endpoints. Again, due to the limited number of bits in the compressed bit vector 1036, a grouping technique is also employed in field 1041. In particular, each 1-bit index in field 1041 may correspond to two adjacent pixels in an image block, i.e., groups of two pixels are created. In an exemplary embodiment, the groups of pixels are created by following a horizontal fashion. For example, the 1-bit index 1055 may correspond to the two leftmost pixels residing in the first row of a four-by-four pixels image block. In other words, the index 1055 of field 1041 is associated to indices 1051 and 1052 of field 1040. Likewise, the index 1056 of field 1041 is associated to indices 1053 and 1054 of field 1040.

Moreover, each 1-bit index in field 1041 may be used to select an appropriate pair of endpoints. For example, if the 1-bit index is clear, Endpoint_0 and Endpoint_1 will be used, i.e., one of the QCPs calculated by equations (12), (13), (14), and (15). If the bit is set, Endpoint_0 and Endpoint_2 will be used, i.e., one of the QCPs calculated by the equations (16), (17), (18), and (19). It should be understood that in accordance with one exemplary embodiment, pixels belonging to the same pixel group, as defined by the 1-bit index of field 1041, are forced to use the same pair of endpoints. Upon the endpoint pairs being chosen, the 2-bit indices of field 1040 are used to drive a selection among equations (12), (13), (14), or (15) (if the corresponding bit in field 1041 is clear) or among equations (16), (17), (18), (19) (if the corresponding bit in field 1041 is set).

Those skilled in the art will recognize that the embodiment of 64-bits 1000, 1036 is effective for source images with low color depths, e.g., in R4B4G5 or R5G6B5 format. However, the embodiment may be also used in images of higher color depths, e.g., R8G8B8, if an increased compression rate is required. Again, the applicants would like to clarify that the suitability of the embodiment with respect to the depth of the source color data is a subject under optimization, e.g., via profiling, and should be identified after analyzing various other parameters of the graphics processing system 100, such as, but not limited to, the arithmetic precision used in the rendering logic, the resolution and the color depths supported by the display, and/or the functionality of the display controller, e.g., if an anti-aliasing algorithm exists.

The bits expansion or bit truncation techniques described in the previous embodiment, i.e., the one described in FIGS. 8A and 8B, may also be applied in exactly the same manner in arrangements 1000 and 1036.

In addition, it should be understood by those skilled in the art that the functionality of a Mode Detector module for detecting the compression mode in the embodiment presented in FIGS. 10A and 10B is similar to the one described in FIG. 9, thus the applicability of the module to the embodiment is not further discussed herein.

Moreover, as can be also understood by those skilled in the art, the flow of the Index Extraction module, as presented in FIG. 7, must be appropriately modified to take into consideration that, in some cases, the 64-bit embodiment is based on creating specific groups of pixels and the same index is assigned for all the pixels in the group. However, the applicants believe that the description of the required modifications is not considered necessary for the complete understanding of the present technology.

Figure 11A:
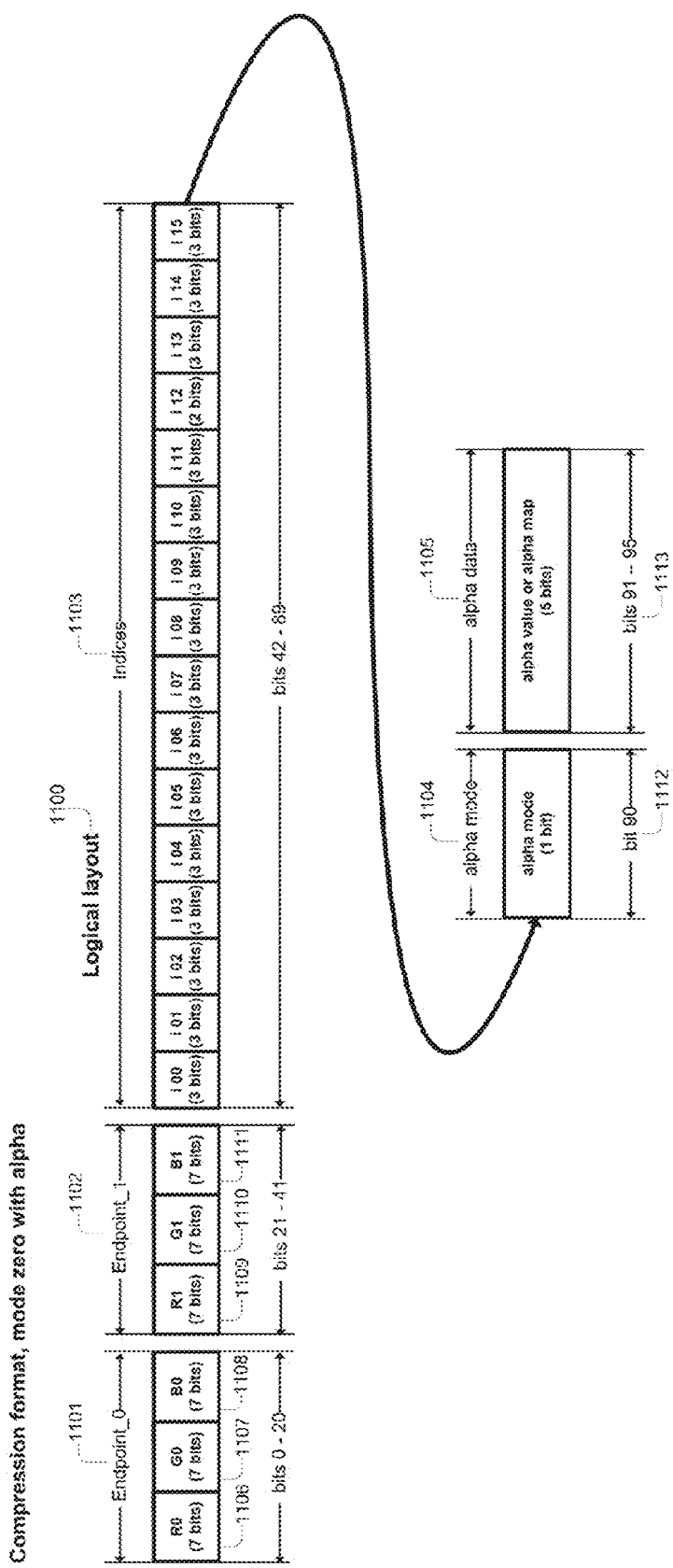
FIGS. 11A and 11B illustrate, at different representation levels, the data fields of a compression form of another exemplary embodiment that also contains transparency information.
Figure 11B:
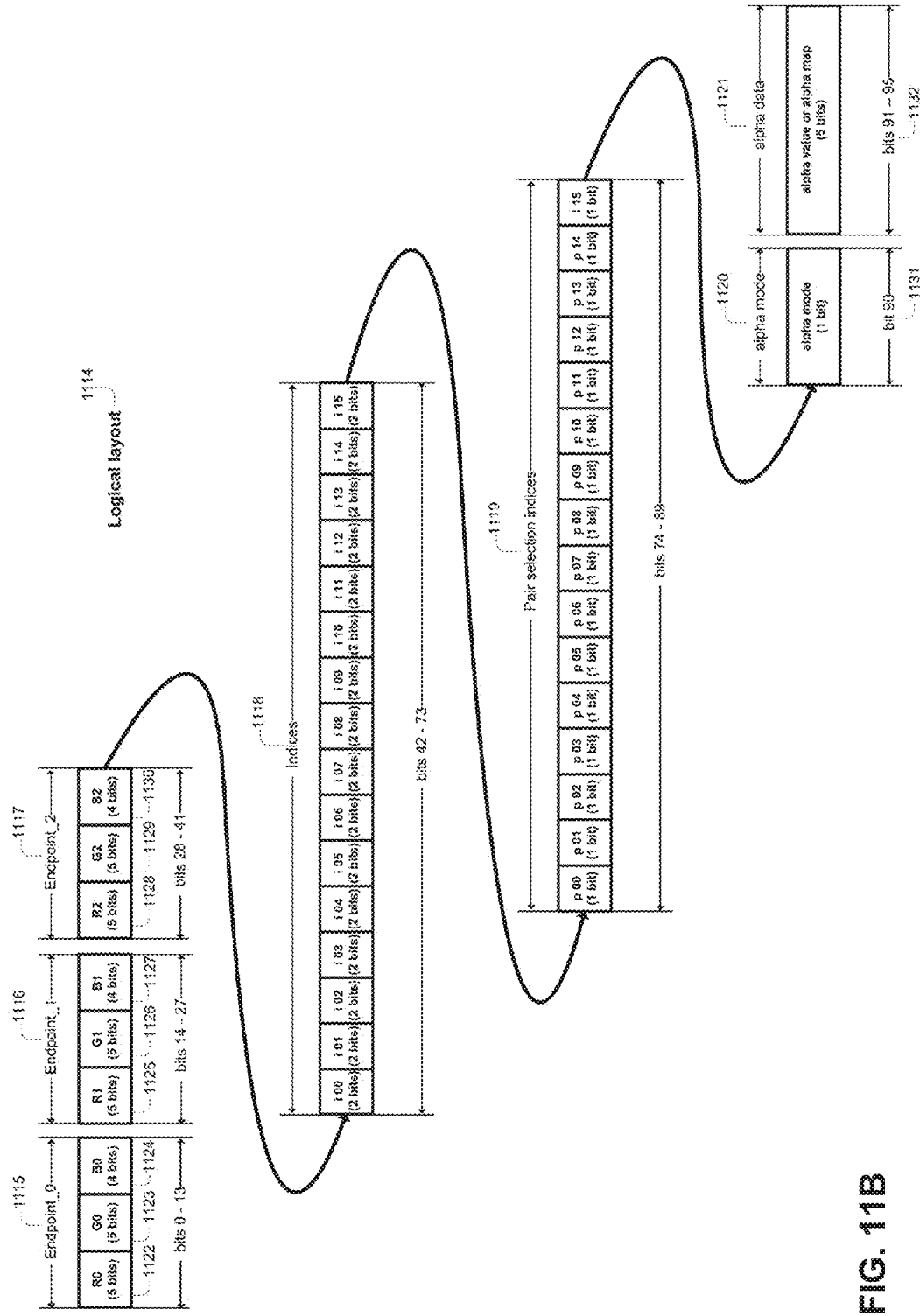

FIGS. 11A and 11B show detailed diagrams of bit sequences representing an encoded image block in accordance to another exemplary embodiment. In essence, the embodiment is derived from the embodiment described in FIGS. 8A and 8B that is modified in order to include transparency information in the encoded bit vector. Thereof, the embodiment in FIGS. 11A and 11B is suitable, but not limited, to encode source images containing both color and alpha information, i.e., images in RBGA format. Those skilled in the art will recognize that the embodiment is particularly applicable for texture compression or for graphics systems employing alpha blending operations.

The encoding of alpha channel information in the compressed form is performed using N-bit, the role of which is described hereafter. It can be understood that due to memory alignment reasons, the total number of bits in the embodiment of FIGS. 8A and 8B or 10A and 10B should remain the same. Thereof, the N-bits for encoding alpha information should be excluded from the number of bits for encoding the RGB color data in the compressed form. For example, in the embodiment presented in FIGS. 8A and 8B, if N-bits are used for representing alpha values in an image block, (96-N)-bits will be used for representing the RGB color values in the said block.

In an embodiment, the indices field 804 of compressed form 800 of FIG. 8A may be divided into two fields including the least and the most significant bits of the index respectively. Moreover, the index grouping technique, i.e., the construction of groups including two pixels, presented in the embodiment 1000 of FIG. 10A may be employed. Similarly, the pair selection indices field 838 of compressed form 833 of FIG. 8B may be halved in size using again the pair grouping technique, i.e., the construction of groups including two pixels, presented in the embodiment 1036 of FIG. 10B. It is clear that the first case is associated with mode zero compression and the second case with mode one compression.

It can be understood that in both cases 8-bits will be excluded from the representation of the RGB color data and those bits may be used for encoding the alpha channel.

In another embodiment, the N-bits may be excluded from the representation of the endpoints within the compressed form, i.e., by reducing the precision of the endpoints. For example, in the arrangement of FIG. 8A 800, if the two endpoints are stored in R7G7B7 format, instead of R8G8B8, then 6-bits can be saved. The modified arrangement employing the truncation technique is depicted in FIG. 11A 1100 where Endpoint_0 1101 and Endpoint_1 1102 are in R7G7B7 format 1106, 1107, 1108, 1109, 1110, 1111, field 1103 remains intact and alpha channel is encoded in fields 1104 and 1105 (6-bits in total 1112, 1113).

Similar to the previous example, in the arrangement of FIG. 8B 833, if the three endpoints are stored in R5G5B4 format, instead of R5G6B5, then 6-bits again can be saved. The modified arrangement 1114 employing the truncation technique is depicted in FIG. 11B where Endpoint_0 1115, Endpoint_1 1116, and Endpoint_2 1117 are in R5G5B4 format 1122, 1123, 1124, 1125, 1126, 1127, 1128, 1129, 1130, fields 1118 and 1119 remain intact and the alpha channel is encoded in fields 1120 and 1121 (6-bits in total 1131, 1132).

Different arrangements are also possible, i.e., the number N-bits for encoding the alpha channel may be increased or decreased as a way to compensate the amount of information lost during the encoding of RGB color data with the amount of information lost during the encoding of alpha channel data.

Again, the exact value of N is considered as a subject under optimization, e.g., via profiling, and should be identified after analyzing various other parameters of the graphics system such as, but not limited to, the depth of the color data in the source image, frequency of accesses to texture memory, the frequency of alpha blending operations, and/or the functionality of the display controller e.g., if an anti-aliasing algorithm exists.

In accordance with one embodiment, the encoding of transparency information is performed in an adaptive manner. A control bit 1104, 1120 is used to control the adaptive operation. In one mode of this operation, a constant alpha value is assumed across all the pixels in the block and the constant alpha value is stored in the compressed form 1105, 1121. In the other mode of operation, a pointer to a map of pre-calculated alpha values is stored in the compressed form 1105, 1121.

Figure 12:
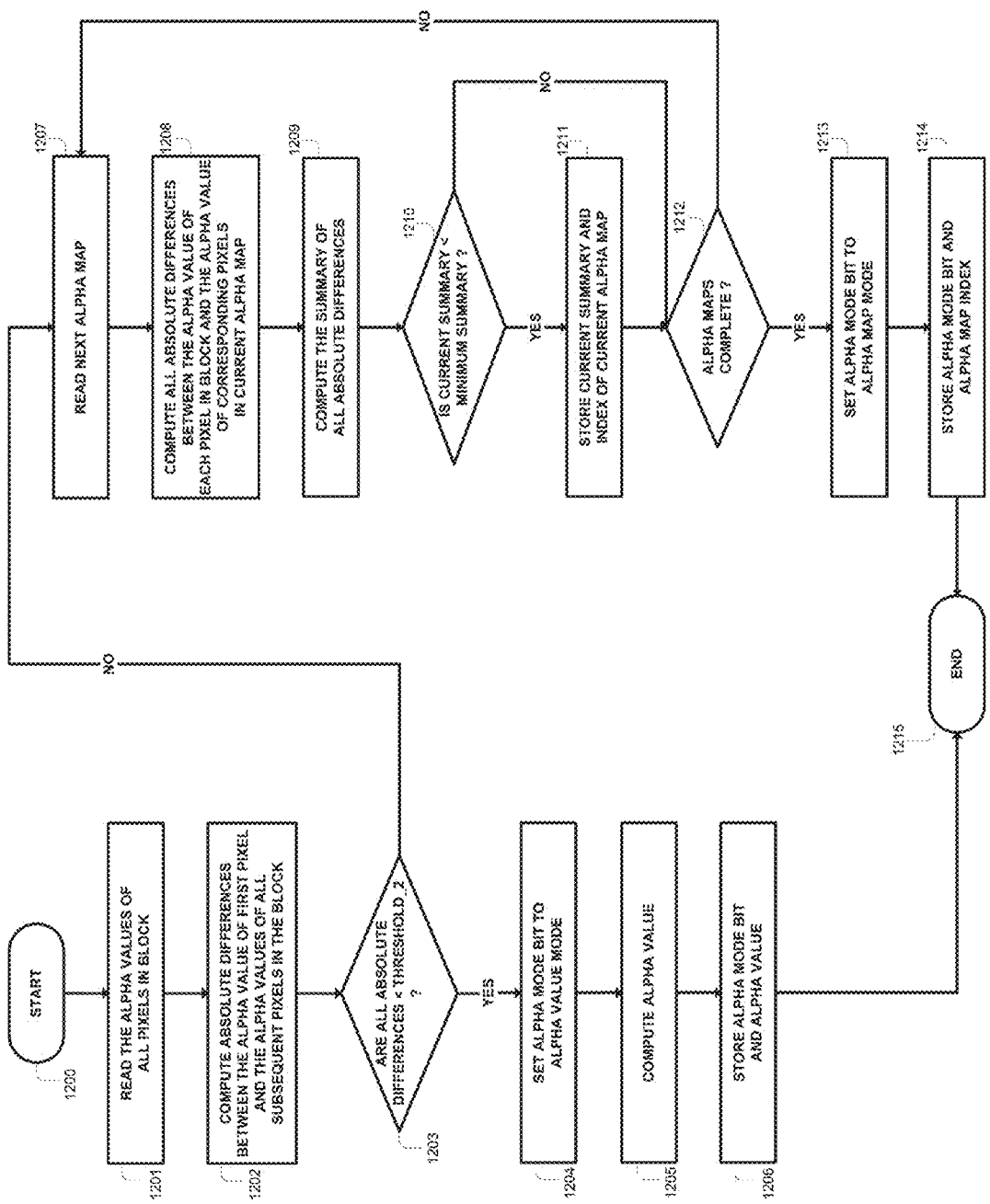
FIG. 12 illustrates a flow diagram of an exemplary embodiment of a Transparency Encoder module in accordance with one or more aspects disclosed herein.

In accordance with another exemplary embodiment, FIG. 12 illustrates a flow diagram of an embodiment of the Transparency Encoder module. As noted, the operation of the module is adaptive. In mode zero, termed as alpha value mode hereafter, the process of alpha encoding tries to identify if the alpha value of all pixels in an image block is constant or almost constant. In mode one, termed as alpha map mode hereafter, the process of alpha encoding tries to identify if the alpha value among the pixels in an image block changes in a "sharp" manner.

Figure 13:
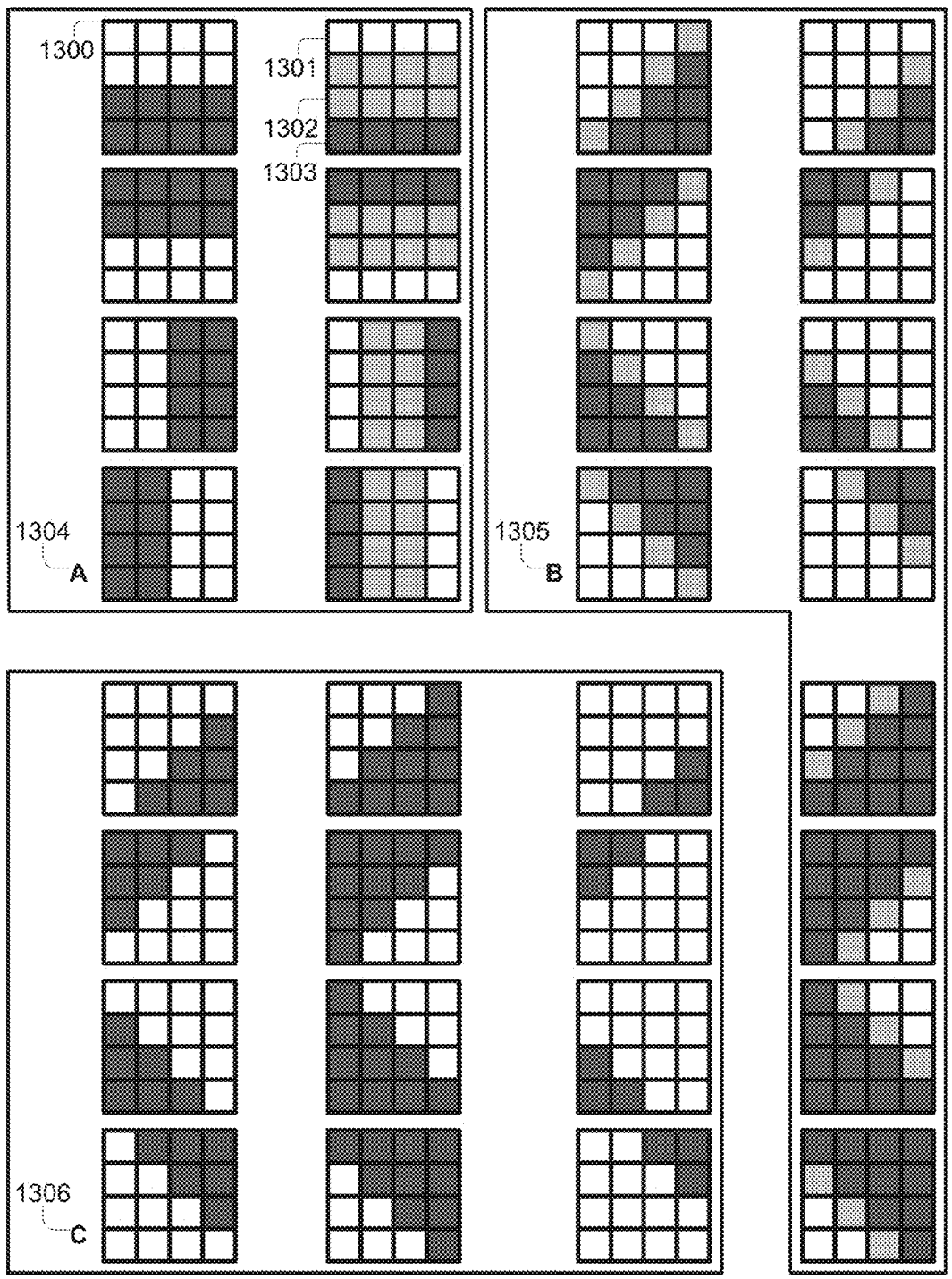
FIG. 13 illustrates various arrangements of the sequence of alpha numerical values within an image block.

In the alpha map mode, the alpha value of the pixels in a block is encoded by selecting a specific alpha map among a set of pre-calculated alpha maps. In essence, the alpha maps are four-by-four pixels blocks where each pixel has a predetermined alpha value. It is understood that the alpha values among the pixels in an alpha map may be, and preferably are, different. FIG. 13 describes in more detail the pre-calculated alpha maps.

In alpha value mode, an arithmetic value is stored to alpha data fields 1105, 1121. The arithmetic value can be assigned to alpha channel in all pixels in an image block during the decompression process. In other words, all pixels in an image block will have the same alpha value. To the contrary, in alpha map mode, a pointer or an ID of an alpha map is stored to alpha data fields 1105, 1121. The alpha values of the pixels in an alpha map will be assigned as the alpha values of the corresponding pixels in an image block. In an exemplary embodiment, the alpha value of N-th pixel in the selected alpha map will be assigned as the alpha value of N-th pixel in an image block where N is integer ranging from 1 till 16 in a four-by-four pixels image block.

At the start 1200 of the process, the alpha values of all pixels in a source image block are read 1201. The next step in the process depicted in FIG. 12 includes an iterative phase 1202 among all pixels in an image block. In the iterative phase, all absolute differences between the alpha value of the "first" pixel in a block and the alpha values of the remaining pixels in a block are computed, i.e., for a four-by-four pixels block, 15 absolute differences are computed. Again, in an exemplary embodiment, the "first" pixel is the pixel residing in the upper leftmost part of a block. In alternative embodiment, the "first" pixel may be any pixel in an image block.

In step 1203, all computed absolute differences are compared against a given threshold THRESHOLD_2. If all the differences are smaller than threshold THRESHOLD_2 1203, then alpha encoding mode is set to alpha value mode and the process continues to step 1204 where the alpha mode bit 1104, 1120 is appropriately updated and to step 1205 where an alpha value representative for all block pixels is computed. After the steps, the results of 1204 and 1205 are stored 1206 in the respective fields of the encoded bit vector, either in fields 1104 and 1105 or in fields 1120 and 1121 respectively, and the process terminates 1215.

In another exemplary embodiment, the representative alpha value computed in 1205 may be the arithmetic average among all pixels in an image block. In another embodiment, the representative alpha value computed in 1205 may be the alpha value of the "first" pixel in an image block.

To the contrary, if one or more of the differences are greater or equal than threshold THRESHOLD_2 1203, then alpha encoding mode is set to alpha map mode, the process continues to 1207 and a new iterative phase begins. In the iterative phase, first an alpha map is read 1207. Then, all absolute differences between the alpha value of each pixel in an image block and the alpha value of corresponding pixels in current alpha map are computed 1208. In other words, the absolute difference between the alpha value of N-th pixel in an image block and the alpha value of N-th pixel in current alpha map are computed where N is an integer number ranging from 1 to 16 in four-by-four pixels image blocks. The last step is repeated for all pixels in an image block 1208.

The next step in the process illustrated in FIG. 12 is to summarize 1209 all the absolute differences calculated in 1208. If the summary is the first calculated summary of absolute differences 1210, it is stored 1211; for clarity, the operation is not shown in FIG. 12. Otherwise, the summary is stored 1211 only if it is less than the previously calculated summary 1210. Note that for each stored summary, the index to the corresponding alpha map is also stored 1211.

The process continues to the next alpha map 1207 until all available alpha maps are complete 1212. After the steps, the process continues to steps 1213 and 1214 where the updated alpha mode bit and the pointer to selected alpha map are stored in the respective fields of the encoded bit vector, either in fields 1104 and 1105 or in fields 1120 and 1121 respectively, and the process terminates 1215.

Threshold THRESHOLD_2 can be either static, i.e., predetermined, or adaptive. Of course, THRESHOLD_2 value should be set in a way to reduce the visual artifacts inserted by the alpha encoding process. In an exemplary embodiment, THRESHOLD_2 value is predefined and remains constant during the operation of the system. In the embodiment, the exact value of THRESHOLD_2 is a subject under optimization, e.g., via profiling, and should be identified after analyzing various other parameters of the graphics system, such as, but not limited to, the depth of the alpha channel in the source image format, the frequency of the alpha blending operations, and/or the texture filtering policy in the 3D rendering unit.

Again, as will be recognized by those skilled in the art, the exemplary embodiment depicted in FIG. 12 requires simple computations, such as additions, subtractions, comparisons, and shift operations, or the like, that can be completed in a relatively small number of GPU cycles—especially in fixed logic arithmetic, thereof the embodiment is well suited for a low die area hardware implementation.

FIG. 13 illustrates a set of alpha maps 1300 in accordance to the embodiment presented in FIGS. 11A and 11B. The number of alpha maps in FIG. 13 is equal to 32 as defined by the 5-bit long alpha data field 1105, 1121. The number of alpha maps may be increased if a larger bit-range is assigned to the field.

The arrangements of alpha maps in FIG. 13 can also be constructed to cover a number of arrangements in alpha values across the pixels in an image block. The white pixels in all alpha maps 1301 corresponds to fully transparent pixels, the black pixels 1303 to fully opaque pixels, and the grey pixels 1302 to semi-transparent or semi-opaque pixels. For example, if the alpha channel in a source image is 8-bits long, then the alpha value of the grey pixels 1302 may be 128.

The alpha maps in FIG. 13 are divided into three groups 1304, 1305, 1306 and each group contains a different arrangement in the changes of the alpha channel across the pixels in a source image block. In group A 1304, the alpha channel changes vertically or horizontally within the block. In group B 1305 and C 1306 the alpha channel changes diagonally within the block, but group C 1306 does not contain semi-transparent or semi-opaque pixels 1302.

The alpha maps in FIG. 13 represent exemplary arrangements and other more effective alpha maps may be constructed. The arrangements in FIG. 13 are produced by experiments. In the experiments, a number of source images were tested and the target was to reduce the visual artifacts inserted by the alpha encoding process.

The alpha maps used in an embodiment of the alpha encoding process may be predefined, e.g., a user of the present technology may select to use the alpha maps presented in FIG. 13, or may be created, e.g., via profiling, prior or even during the alpha encoding process.

A copy of the alpha maps can be located in the image compression and decompression modules. The copy may be stored to any kind of local (e.g., scratchpad) or system memory and the memory can be an SRAM or DRAM memory, or the like.

In accordance with one exemplary embodiment, the Transparency Encoder module and the Block Encoder module may operate in a separate fashion, that is, the Block Encoder module operates in the color data of a source image block and the Transparency Encoder module operates independently in the transparency data of the source image block. In one exemplary embodiment, the two modules may operate in parallel, that is, the processes described in FIGS. 4 and 12 start simultaneously. In another embodiment, the two modules may operate sequentially, that is, upon the process described in FIG. 4 terminating, the process described in FIG. 12 starts or upon the process described in FIG. 12 terminating, the process described in FIG. 4 starts.

While the invention has been described in conjunction with several specific embodiments, many further alternatives, modifications, and variations will be apparent to those skilled in the art in light of the disclosed description. Thus, the invention described in the present document is intended to embrace all such alternatives, modifications, and variations as may fall within the scope of the included claims.

What is claimed is:

1. In a graphics processing system, a method for compressing source image data comprising:
dividing the source image into image blocks of a fixed number of pixels, each pixel having an associated color and alpha information;
encoding each image block in a compressed form of the image block including:
selecting an adaptive number of representative color components, the representative color components encoded with at least two precisions in the compressed form, the representative color components associated with pixels of the image block,
calculating an adaptive number of additional color components derived from the selected representative color components,
generating an index for each pixel in the image block,
associating the index with one representative color component or with one color component derived from the representative color components, wherein the index may be split in two partitions, and one partition may be used to select two of the at least two representative color components, and
selecting an adaptive number of alpha values for the image block wherein either a unified, computed alpha value is assigned to each pixel in the image block, or different pre-calculated alpha values are assigned to at least two pixels in the image block; and
composing the compressed forms of all blocks comprising the source image to generate a compressed image.

2. The method of claim 1, the selection of representative color components is implemented with one or more arithmetic operations including subtractions, additions, comparisons, and shift operations.

3. The method of claim 1, wherein calculating the additional color components from the selected representative color components is performed with arithmetic fixed point operations including one or more of additions and shift operations.

4. The method of claim 1, wherein calculating the additional color components from the selected representative color components is performed with arithmetic operations in fixed point format.

5. The method of claim 1, wherein calculating the additional color components from the selected representative color components is performed with arithmetic operations in floating point format.

6. The method of claim 1, wherein associating the index for each pixel in the image block with one representative color component or with one color component derived from the representative color components further comprises:
computing a pixel color error value for each representative color component and for each derived color component; and
outputting the index producing the minimum computed color error value among all computed errors.

7. The method of claim 1, wherein the encoding of the selected representative color components in the compressed form is done in fixed point format.

8. The method of claim 1, wherein the encoding of the selected representative color components in the compressed form is done in floating point format.

9. The method of claim 1, wherein further compression of the compressed form is achieved by associating one index to two contiguous pixels of the image block.

10. The method of claim 1, wherein further compression of the compressed form is achieved by splitting an index of a pixel in the image block in two partitions and associating one partition to two contiguous pixels of the image block.

11. The method of claim 1, wherein the encoding of the computed alpha value in the compressed form is done in fixed point format.

12. The method of claim 1, wherein the encoding of the computed alpha value in the compressed form is done in floating point format.

13. The method of claim 1, wherein the adaptive selection of either assigning a unified alpha value to all pixels of the image block or assigning at least two values to at least two pixels in the image block further comprises:
- computing the unified alpha value;
- computing a cumulative alpha error value between the unified alpha value and alpha values of all pixels in the image block;
- selecting at least two pre-calculated values from a set of pre-calculated alpha values;
- computing another cumulative error between the at least two alpha values and alpha values of the pixels in the image block; and
- outputting the selection producing the minimum computed cumulative alpha error value among the computed error values and the error values are computed in fixed point format.

14. The method of claim 1, wherein the adaptive selection of either assigning a unified alpha value to all pixels of the image block or assigning at least two values to at least two pixels in the image block further comprises:
- computing the unified alpha value;
- computing alpha error values between the unified alpha value and alpha values of the pixels in the image block;
- selecting at least two pre-calculated values from a set of pre-calculated alpha values;
- computing an alpha error value between the at least two alpha values and alpha values of the pixels in the image block; and
- outputting the selection producing the minimum computed alpha error value among the computed alpha error values and the alpha error values are computed in floating point format.

15. The method of claim 13, wherein the cumulative alpha error value is the summary of the absolute differences generated for each pixel in the image block.

16. The method of claim 13, wherein the cumulative alpha error value is computed based on a root-mean-square error for the image block.

17. The method of claim 14, wherein a cumulative alpha error value is the summary of the absolute differences generated for each pixel in the image block.

18. The method of claim 14, wherein a cumulative alpha error value is computed based on a root-mean-square error for the image block.

19. The method of claim 1, wherein the number of pre-calculated alpha values is adaptive and the number is determined prior to compression.

20. The method of claim 1, wherein the pre-calculated alpha values are generated by profiling, prior to compression, using image quality criteria.

21. The method of claim 1, wherein at least two image blocks are encoded simultaneously.

22. A non-transitory computer readable information storage media having stored thereon instructions, that specifically configure one or more processors for execution of the instructions, to perform the method of claim 1.

23. The method of claim 1, wherein the method is performed in the processing system, and the processing system includes one or more of the following elements in communication: a CPU, memory, a display controller and a graphics processing unit.

24. A graphics processing system to compress image data comprising:
- a CPU, geometry buffer, texture buffer; rendering logic and output buffer adapted to:
- divide the source image into image blocks of a fixed number of pixels, each pixel having an associated color and alpha information;
- encode each image block in a compressed form of the image block including:
  - select an adaptive number of representative color components, the representative color components encoded with at least two precisions in the compressed form, the representative color components associated with pixels of the image block,
  - calculate an adaptive number of additional color components derived from the selected representative color components,
  - generate an index for each pixel in the image block,
  - associate the index with one representative color component or with one color component derived from the representative color components, wherein the index may be split in two partitions, and one partition may be used to select two of the at least two representative color components, and
  - select an adaptive number of alpha values for the image block wherein either a unified, computed alpha value is assigned to each pixel in the image block, or different pre-calculated alpha values are assigned to at least two pixels in the image block; and
- compose the compressed forms of all blocks comprising the source image to generate a compressed image.

* * * * *